US012605846B1

(12) United States Patent　　(10) Patent No.:　US 12,605,846 B1
Woo　　(45) Date of Patent:　Apr. 21, 2026

(54) LARGE-CAPACITY COOKING ROBOT SYSTEM PERFORMING LARGE-CAPACITY COOKING THROUGH MULTIPLE MODES

(71) Applicant: HANKOOKROBOTICS Co., Ltd., Gyeonggi-do (KR)

(72) Inventor: Chong Young Woo, Gyeongsangnam-do (KR)

(73) Assignee: HANKOOKROBOTICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/360,494

(22) Filed: Oct. 16, 2025

(30) Foreign Application Priority Data

Dec. 26, 2024　(KR) ........................ 10-2024-0196426

(51) Int. Cl.
　*B25J 11/00*　　(2006.01)
　*B25J 9/16*　　(2006.01)
　*B25J 15/00*　　(2006.01)
　*B25J 19/02*　　(2006.01)

(52) U.S. Cl.
　CPC ......... *B25J 11/0045* (2013.01); *B25J 9/1679* (2013.01); *B25J 15/0033* (2013.01); *B25J 19/02* (2013.01)

(58) Field of Classification Search
　CPC .. B25J 9/1679; B25J 11/0045; B25J 15/0033; B25J 19/02
　See application file for complete search history.

(56) References Cited

U.S. PATENT DOCUMENTS

| | | | |
|---|---|---|---|
| 2021/0078186 A1* | 3/2021 | Son ...................... | B25J 15/0491 |
| 2022/0248912 A1* | 8/2022 | Kodali ................... | A47J 44/00 |
| 2022/0257060 A1* | 8/2022 | Kodali ................... | A47J 44/00 |
| 2022/0338679 A1* | 10/2022 | Poruks ................ | B25J 11/0045 |
| 2023/0098024 A1* | 3/2023 | Ghafari .................. | A47J 36/32 99/326 |
| 2023/0292957 A1* | 9/2023 | Wach ........................ | A23L 5/11 426/233 |

FOREIGN PATENT DOCUMENTS

| | | | |
|---|---|---|---|
| JP | 5938541 | B | 6/2016 |
| JP | 3232851 | U * | 7/2021 |
| KR | 200424894 | Y | 8/2006 |
| KR | 101452153 | B1 | 10/2014 |
| KR | 101534025 | B1 | 7/2015 |
| KR | 102363803 | B1 | 2/2022 |
| KR | 102395802 | B1 | 5/2022 |

(Continued)

OTHER PUBLICATIONS

English Machine Translation of KR101452153B1—Accessed Dec. 10, 2025 (Year: 2014).*

(Continued)

*Primary Examiner* — Thomas E Worden
*Assistant Examiner* — Blake A Wood
(74) *Attorney, Agent, or Firm* — Umberg Zipser LLP

(57)　　ABSTRACT

According to some embodiments of the present disclosure, a cooking robot system may include a first kettle, a multi-joint robot, and a controller, and wherein the controller, when controlling a movement of the multi-joint robot to grip a cooking utensil, determines whether to rotate a gripper unit coupled to the multi-joint robot according to a kind of the cooking utensil.

14 Claims, 16 Drawing Sheets

(56)         References Cited

FOREIGN PATENT DOCUMENTS

| KR | 1020220134286 | A |    | 10/2022 | | |
|----|---------------|---|----|---------|---|---|
| KR | 102474283 | B1 | * | 12/2022 | .......... | H05B 6/1209 |
| KR | 1020230107729 | A |    | 7/2023 | | |
| KR | 102571941 | B1 |    | 8/2023 | | |
| KR | 102602076 | B1 |    | 11/2023 | | |
| KR | 102624955 | B1 |    | 1/2024 | | |
| KR | 102624964 | B1 |    | 1/2024 | | |

OTHER PUBLICATIONS

English Machine Translation of KR102363803B1—Accessed Dec. 10, 2025 (Year: 2022).*
English Machine Translation of KR102474283B1—Accessed Dec. 10, 2025 (Year: 2022).*
English Machine Translation of KR102624964B1—Accessed Dec. 10, 2025 (Year: 2024).*
English Machine Translation of KR20220073596A—Accessed Dec. 10, 2025 (Year: 2022).*
English Machine Translation of JP3232851U—Accessed Dec. 10, 2025 (Year: 2021).*

* cited by examiner

LARGE-CAPACITY COOKING ROBOT SYSTEM PERFORMING LARGE-CAPACITY COOKING THROUGH MULTIPLE MODES

BACKGROUND

1. Technical Field

The present disclosure relates to a large-capacity cooking robot system performing large-capacity cooking through multiple modes, and more specifically, to a cooking robot system configured such that a single cooking robot system is capable of performing various types of cooking including deep-frying, stir-frying, and soup/stew cooking through multiple modes, thereby increasing the utilization of the robot.

2. Related Art

From the past, robot systems have been deployed in various industrial manufacturing sites such as automobiles, mechanical parts, and electronic products, and have been used for the purpose of performing tasks that are difficult or dangerous for humans or of rapidly processing repetitive tasks.

Recently, robot systems have been deployed not only in industrial manufacturing sites but also in spaces familiar to people, to assist or replace human work and improve work efficiency.

One representative example is food cooking facilities.

In particular, in facilities that cook food in large quantities, robot systems can be used efficiently.

Recently, due to the intensification of inflation, the labor cost of cooking personnel has been rising. In addition, cooking in large quantities-such as deep-frying, stir-frying, and soup/stew cooking-requires high labor intensity, which tends to make people avoid such work. Especially because food cooking mostly involves fire and hot water, safety accidents may occur during large-scale cooking operations.

Recently, robot systems have been introduced into cooking facilities to assist human work, thereby reducing human labor intensity and the incidence rate of safety accidents, and enabling repetitive and simple cooking tasks to be performed quickly.

However, until recently, robot systems introduced into cooking facilities have often been designed to perform only a single type of cooking. For example, a robot system may be designed solely to perform deep-frying, in which case it cannot perform other cooking types such as stir-frying or soup/stew cooking. Because such systems are designed for only one type of cooking, there is a limitation in that they cannot perform diverse cooking.

In addition, in cases where a cooking robot system is introduced, cooks cannot perform separate dishes using the cooking robot system, and thus, when the cooking robot system is not in use, there arises the problem that the system cannot be utilized at all.

SUMMARY

The present disclosure is intended to solve the aforementioned problems and other problems. A technical problem to be solved by some embodiments of the present disclosure is to increase the utilization of the cooking robot system and to enable the use of the kettle even in cases where the articulated robot is not used.

The technical problems to be solved in the present disclosure are not limited to the technical problems mentioned above, and other technical problems not mentioned will be clearly understood by those skilled in the art from the description below.

According to some embodiments of the present disclosure, a cooking robot system may include a first kettle, a multi-joint robot, and a controller, and wherein the controller, when controlling a movement of the multi-joint robot to grip a cooking utensil, determines whether to rotate a gripper unit coupled to the multi-joint robot according to a kind of the cooking utensil.

According to some embodiments of the present disclosure, the first kettle may include an automatic water supply unit that fills the first kettle with water, and wherein the automatic water supply unit comprises: a water supply line that draws water from an external water storage or a tap water supply source; an electric valve that operates upon receiving a control signal from the controller via wired or wireless communication; and a water supply amount sensing unit that recognizes an amount of water supplied into the first kettle.

According to some embodiments of the present disclosure, the controller may control the automatic water supply unit to supply a preset amount of water to the first kettle according to a prestored recipe.

According to some embodiments of the present disclosure, the cooking robot system may further include a temperature sensor for checking a temperature of water supplied to the first kettle, and the controller may control a temperature of the first kettle such that the temperature of the water supplied to the first kettle becomes a preset temperature according to a prestored recipe, and may control an output unit to output a preset alert when the temperature of the water supplied to the first kettle reaches the preset temperature via the temperature sensor.

According to some embodiments of the present disclosure, after the controller controls the output unit to output the preset alert, the controller may recognize a currently selected mode among multiple modes, and may determine whether to cook food in the first kettle by controlling a movement of the multi-joint robot in conjunction with controlling the first kettle, depending on a type of the currently selected mode.

According to some embodiments of the present disclosure, the controller may, when recognizing that a manual mode among the multiple modes is selected, control the first kettle and not control a movement of the multi-joint robot, and, when recognizing that an automatic mode among the multiple modes is selected, control a movement of the multi-joint robot in conjunction with controlling the first kettle, in order to cook food in the first kettle.

According to some embodiments of the present disclosure, the cooking robot system may further include a second kettle different from the first kettle, and the controller may control at least one of an amount of water supplied to the first kettle and a temperature of the first kettle, separately from controlling at least one of an amount of water supplied to the second kettle and a temperature of the second kettle.

According to some embodiments of the present disclosure, the controller may control an amount of water supplied to the first kettle and a temperature of the first kettle, and may control a movement of the multi-joint robot.

According to some embodiments of the present disclosure, the gripper unit may be detachably coupled to each of a plurality of cooking utensils to cook different types of food.

According to some embodiments of the present disclosure, the cooking utensil may include a ladle base portion coupled to the gripper unit, a ladle portion connected to a lower part of the ladle base portion, and a detachable coupling configured to detachably connect the ladle base portion and the ladle portion.

According to some embodiments of the present disclosure, the ladle base portion may include a first base, a second base spaced apart from the first base, a side base connecting both ends of the first base and both ends of the second base, and a ladle link rod having an upper part connected to the first base and a lower part to which the detachable coupling is disposed.

According to some embodiments of the present disclosure, the ladle base portion may further include a fitting block that connects an upper part of the first base and an upper part of the second base, and in which a fitting hole is formed to penetrate through a central side, and the second base may be inclined toward the first base from bottom to top.

According to some embodiments of the present disclosure, the ladle portion may include a ladle rod in which a ladle opening groove is formed at an upper end to receive a lower end of the ladle link rod, and a cooking block connected to a lower end of the ladle rod.

According to some embodiments of the present disclosure, the detachable coupling may include a detaching hole formed to penetrate through an upper part of the ladle rod, and a spring pin disposed to protrude radially from a lower part of the ladle link rod, and the spring pin may be detachably inserted into the detaching hole such that the ladle rod and the ladle link rod are detachable from each other.

According to some embodiments of the present disclosure, the cooking utensil may further include a hanger portion disposed on the ladle link rod, wherein the hanger portion may include a hanger plate connected to the ladle link rod, and a hanger block connected to a lower part of the hanger plate and protruding toward the ladle portion.

According to some embodiments of the present disclosure, the hanger block may have a triangular prism shape, and the hanger portion may further include a hanger flat surface that is formed flat along a longitudinal direction of the hanger block on at least one edge among a plurality of edges forming the hanger block.

According to some embodiments of the present disclosure, the cooking robot system may further include a holder that is placed in a cooking facility, to which the hanger portion is coupled, and on which the cooking utensil is mounted, wherein the holder may include a holder frame, a holder connecting bar that is connected to the holder frame and inclined downward, and a holder block connected to the holder connecting bar and in which a holder groove is formed, the holder groove being configured to receive the hanger block.

According to some embodiments of the present disclosure, the holder block and the holder groove may have a triangular prism shape larger than the hanger block, and the holder may further include a holder flat surface that is formed flat along a longitudinal direction of the holder groove on at least one edge among a plurality of edges forming the holder block, the at least one edge being located at a position corresponding to the hanger flat surface, wherein the hanger flat surface is inserted into the holder flat surface, the cooking utensil is mounted at a designated position on the holder, the multi-joint robot moves to the designated position, and the gripper unit grips the ladle base portion.

According to some embodiments of the present disclosure, the holder may further include a holder beam disposed below the holder block on the holder frame and configured to support a side of the ladle rod, wherein the holder beam may include a first holder beam and a second holder beam that open in directions facing each other.

According to some embodiments of the present disclosure, the cooking utensil may include a frying basket, wherein the frying basket may include a basket mesh configured to accommodate cooking ingredients, a rounded portion formed at a lower part of the basket mesh and curved downward, and a basket frame connected to an upper part of the basket mesh and coupled to the gripper unit, wherein the basket frame may include a first bar that is connected to the basket mesh, protrudes upward, and is bent in a rectangular beam shape, a second bar that is disposed adjacent to the first bar on the basket mesh, protrudes upward in an inclined manner, and is bent in a rectangular beam shape, a first lower crossbar that connects across both sides of the first bar, a second lower crossbar that connects across both sides of the second bar, and an upper crossbar that connects upper parts of the first bar and the second bar.

The technical means that can be obtained from the present disclosure are not limited to those mentioned above, and other technical means not mentioned will be clearly understood by those skilled in the art from the description below.

The advantageous effects of the cooking robot system according to the present disclosure are as follows.

According to some embodiments of the present disclosure, various types of cooking such as deep-frying, stir-frying, and soup/stew cooking can be performed using a single robot. Whereas conventional robots were capable of performing only a specific type of cooking, the cooking robot system according to the present disclosure can perform various types of cooking by changing cooking utensils. In particular, stirring can be implemented through the multi-joint robot, thereby enabling more diverse cooking operations.

According to some embodiments of the present disclosure, deep-frying can be performed using a large kettle instead of a fryer. In particular, in school meal cooking facilities, existing large kettles can be utilized to perform deep-frying.

According to some embodiments of the present disclosure, the utilization of the robot can be improved. Especially in school meal cooking facilities where the Ministry of Education limits deep-frying to twice a week, the robot can perform other cooking such as stir-frying and soup/stew cooking during the remaining three days without resting, thereby enhancing operability of the robot.

According to some embodiments of the present disclosure, even when the multi-joint robot is not used, food can be cooked using the kettle that constitutes the cooking robot system by utilizing multiple modes.

The advantageous effects that can be obtained through the present disclosure are not limited to the effects mentioned above, and other effects not mentioned will be clearly understood by those skilled in the art from the following description.

BRIEF DESCRIPTION OF THE DRAWINGS

Various embodiments of the present disclosure are described with reference to the drawings, in which similar reference numbers are collectively used to refer to similar components. In the following embodiments, for the purpose of explanation, many specific details are provided to give a comprehensive understanding of one or more embodiments. However, it will be apparent that such embodiments may be implemented without these specific details.

Figure 1:
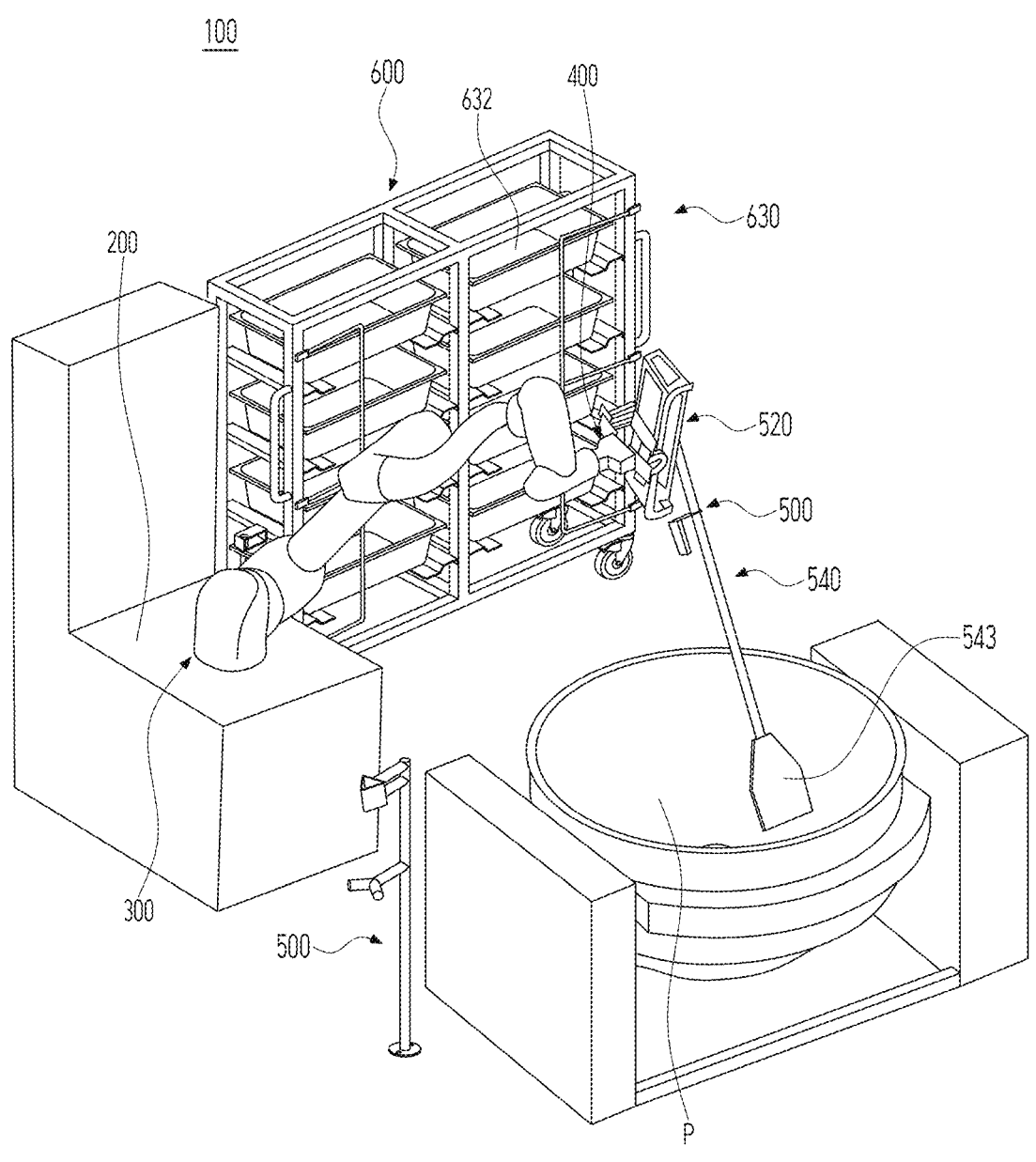

FIG. 1 is a diagram illustrating a cooking robot system according to some embodiments of the present disclosure.

Figure 2:
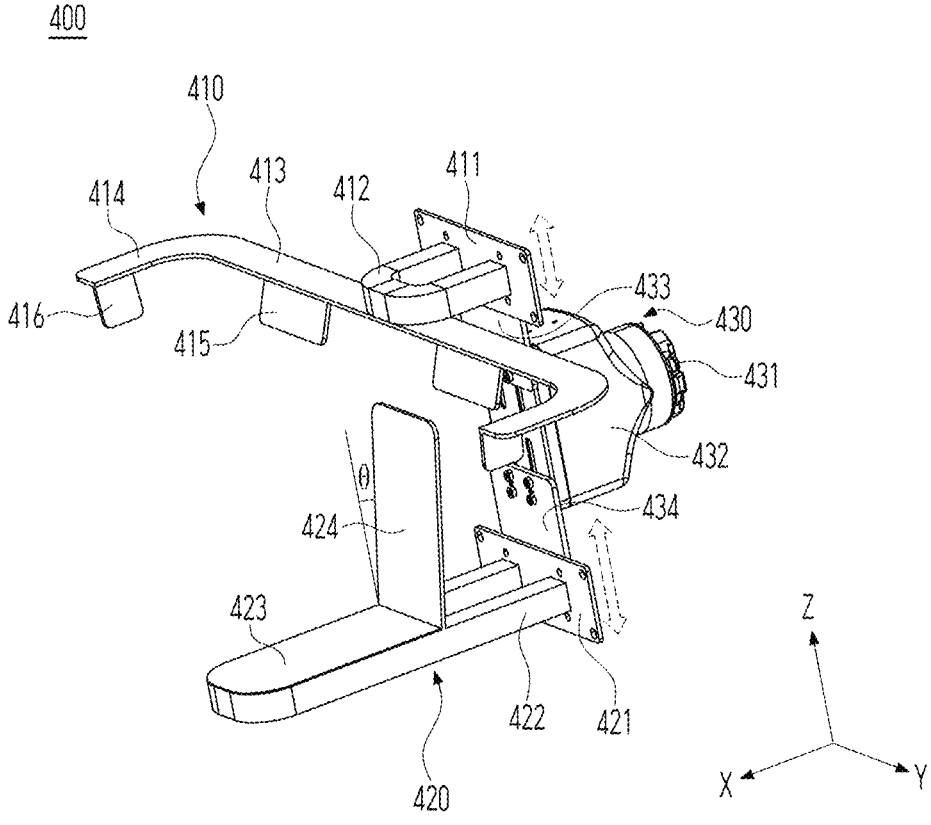

FIG. 2 is a diagram illustrating a gripper unit according to some embodiments of the present disclosure.

Figure 3:
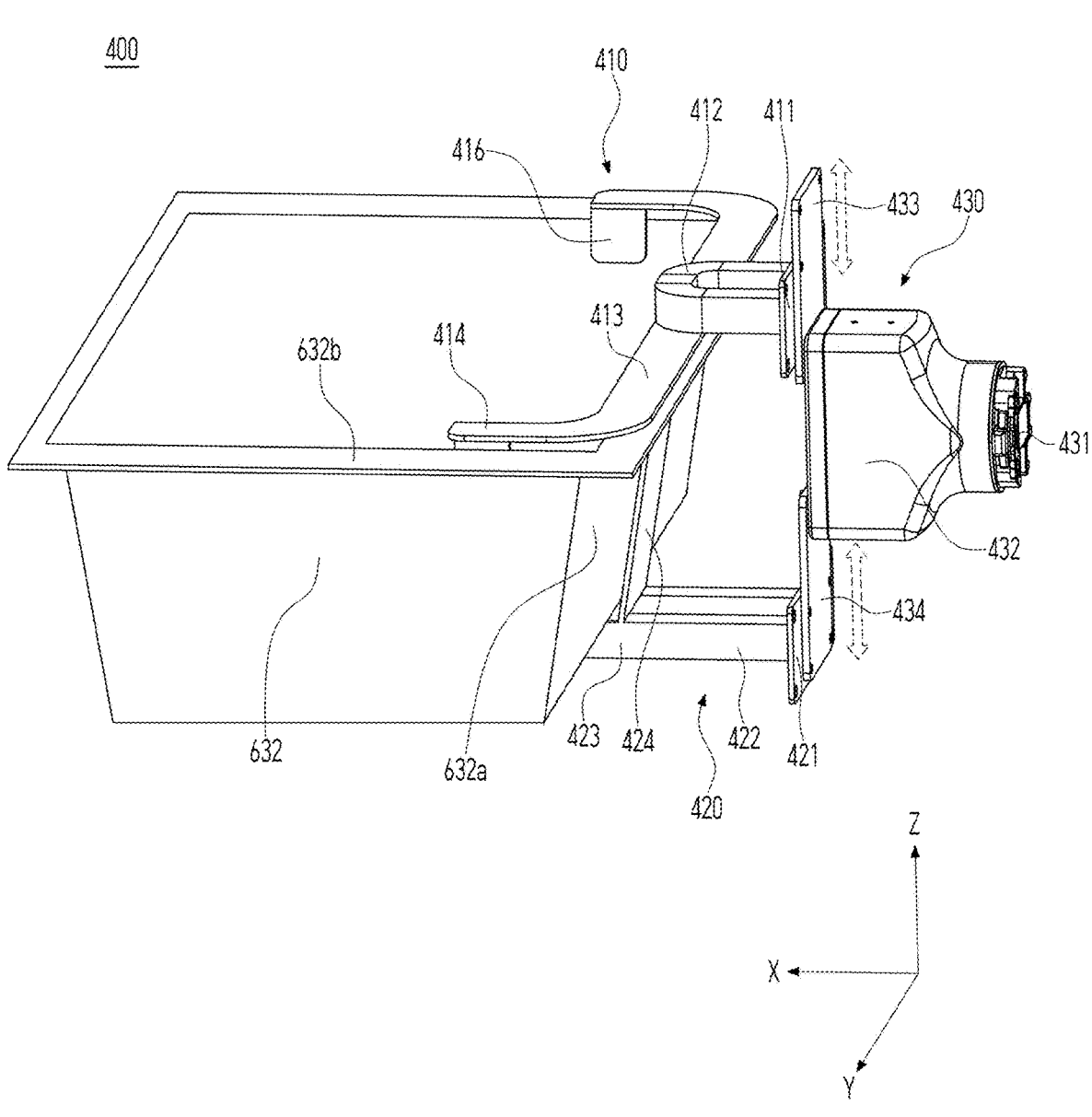

FIG. 3 is a diagram illustrating a coupling structure between the gripper unit and a basket according to some embodiments of the present disclosure.

Figure 4:
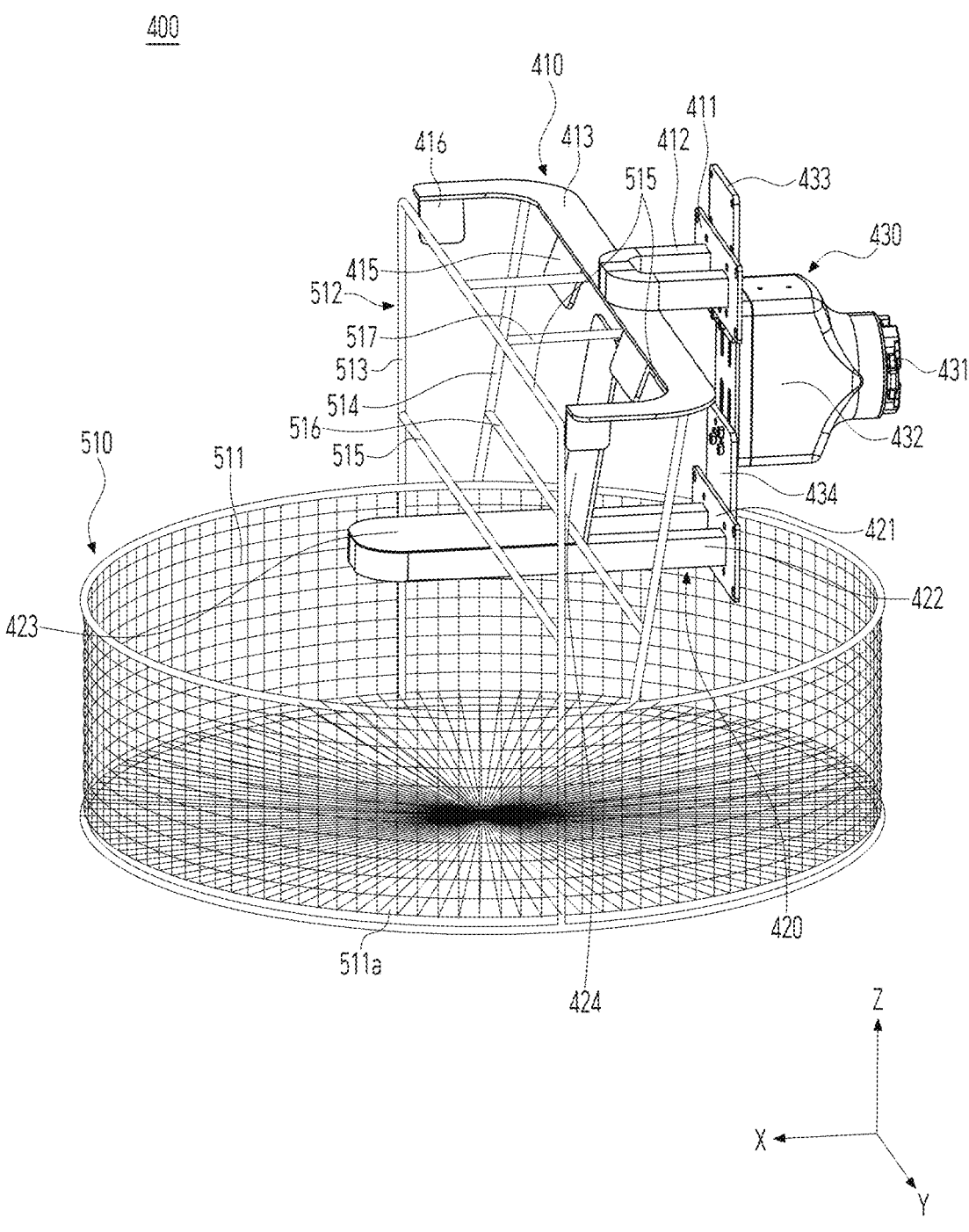

FIG. 4 is a diagram illustrating a coupling structure between the gripper unit and a frying basket according to some embodiments of the present disclosure.

Figure 5:
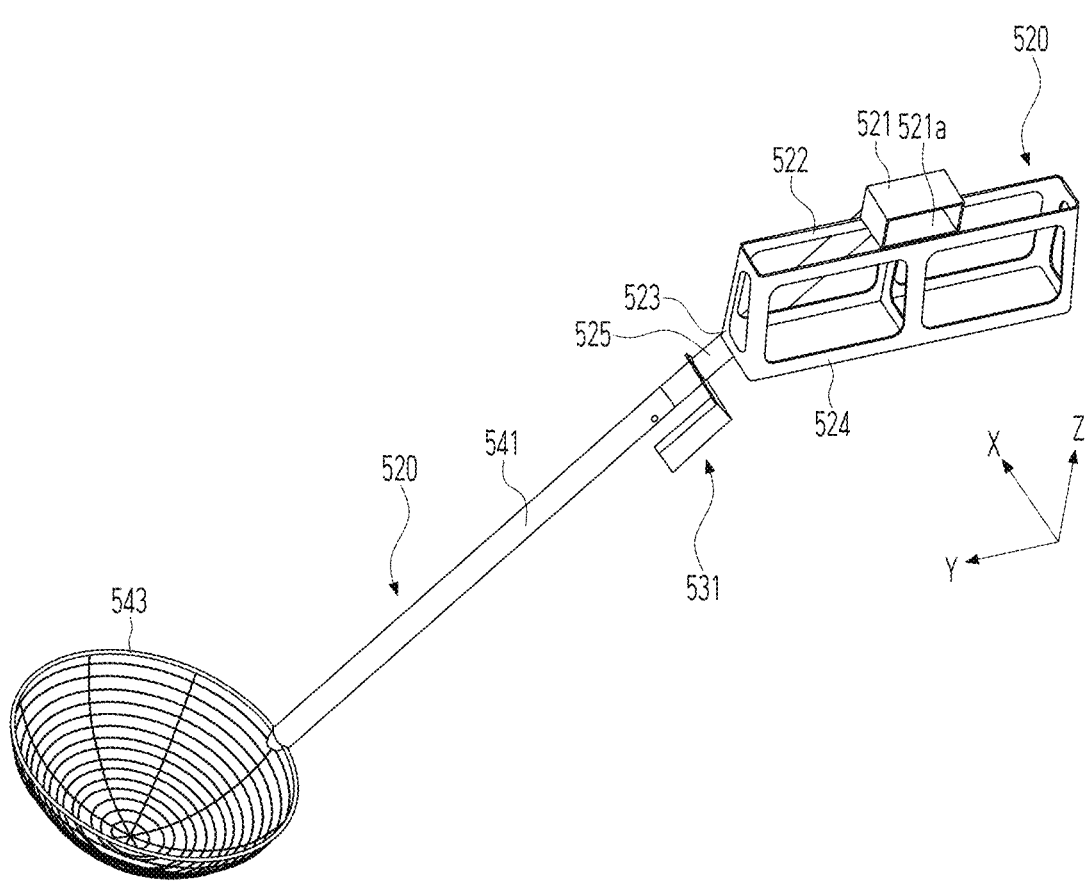

FIG. 5 is a diagram illustrating a cooking utensil in the form of a frying mesh according to some embodiments of the present disclosure.

Figure 6:
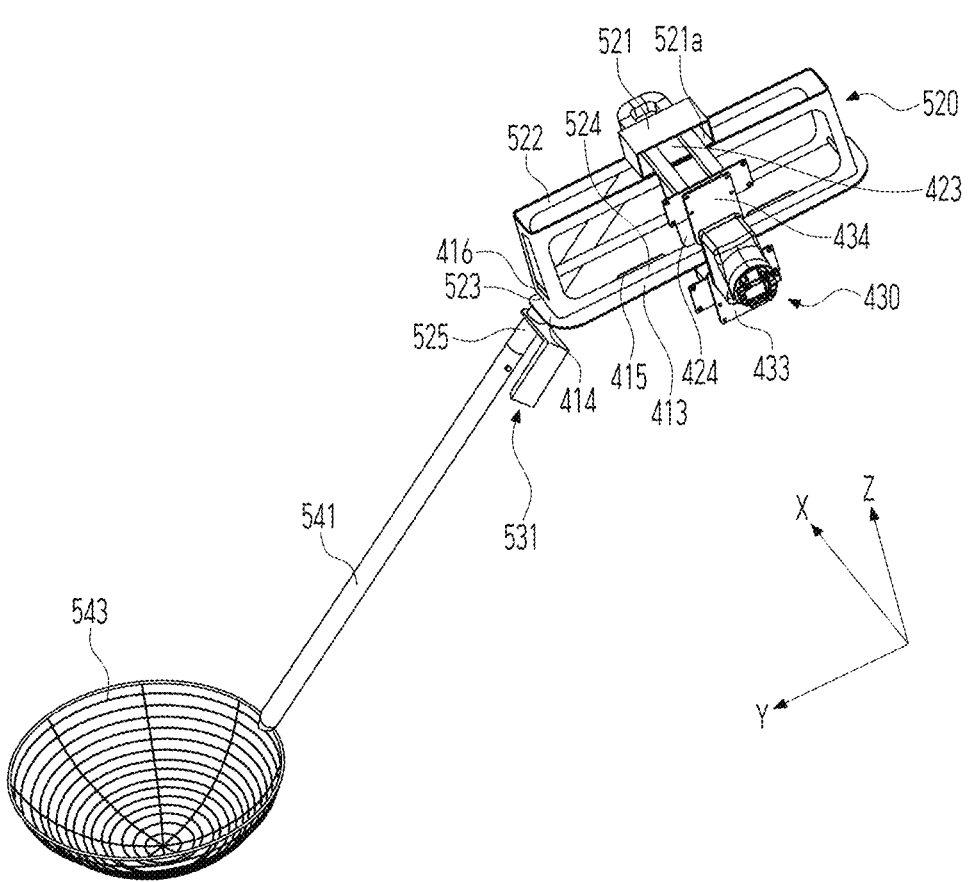

FIG. 6 is a diagram illustrating a coupling structure between the gripper unit and a cooking utensil according to some embodiments of the present disclosure.

Figure 7:
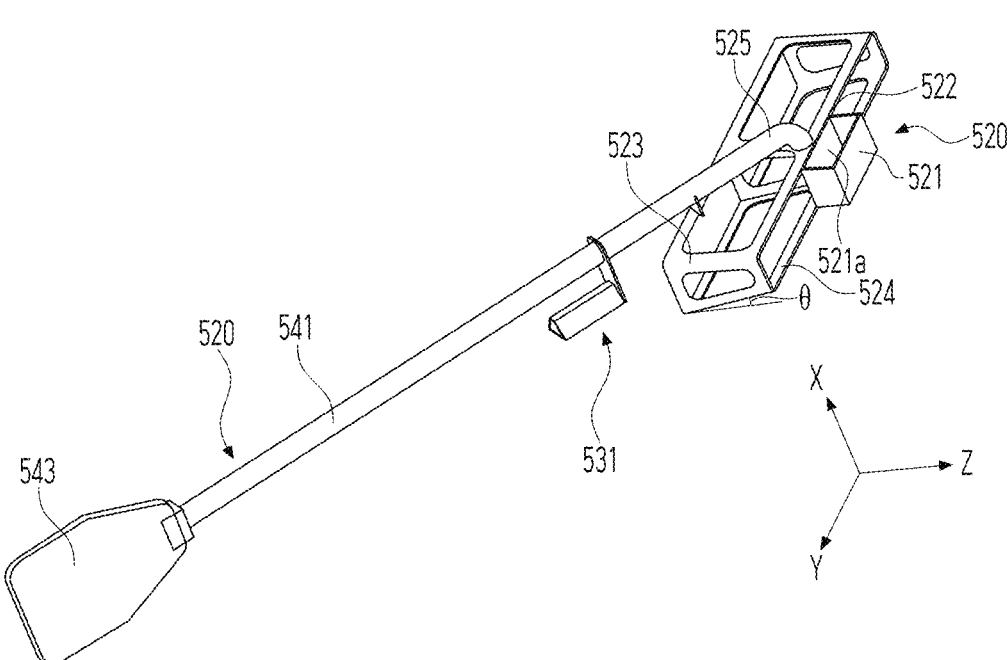

FIG. 7 is a diagram illustrating a cooking utensil in the form of a mixing plate according to some embodiments of the present disclosure.

Figure 8:
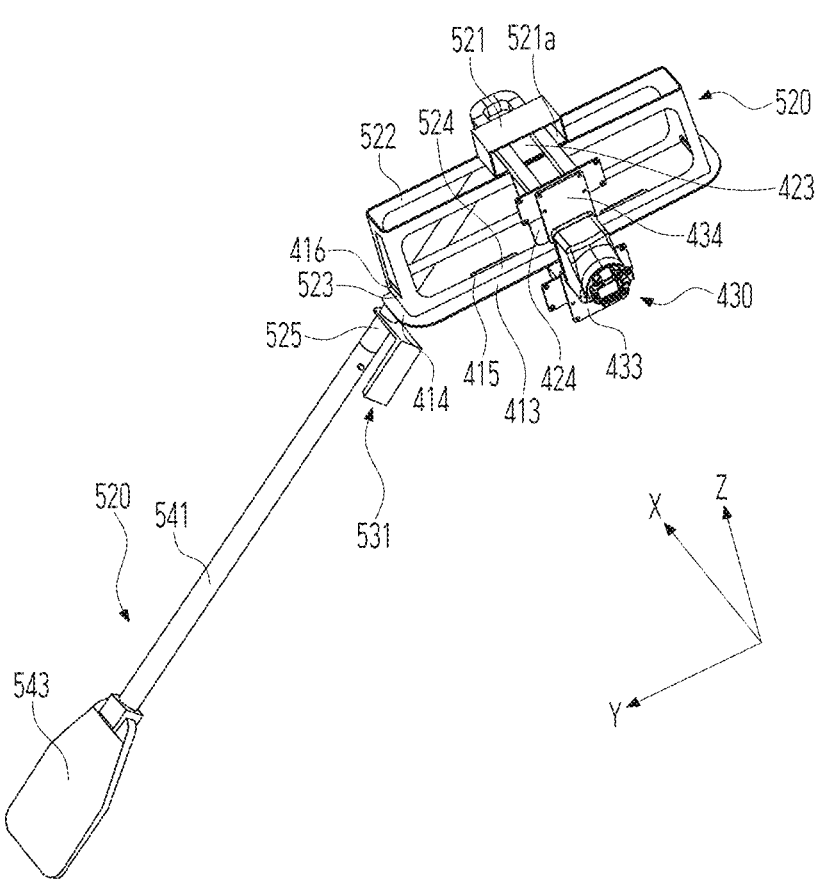

FIG. 8 is a diagram illustrating a coupling structure between the gripper unit and a cooking utensil according to some embodiments of the present disclosure.

Figure 9:
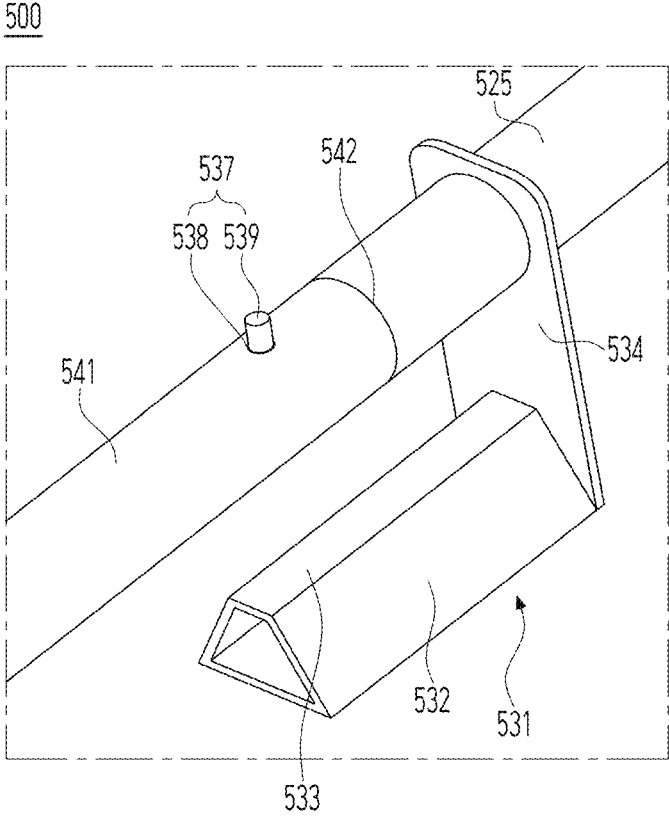

FIG. 9 is a diagram illustrating a hanger portion and a detachable coupling according to some embodiments of the present disclosure.

Figure 10:
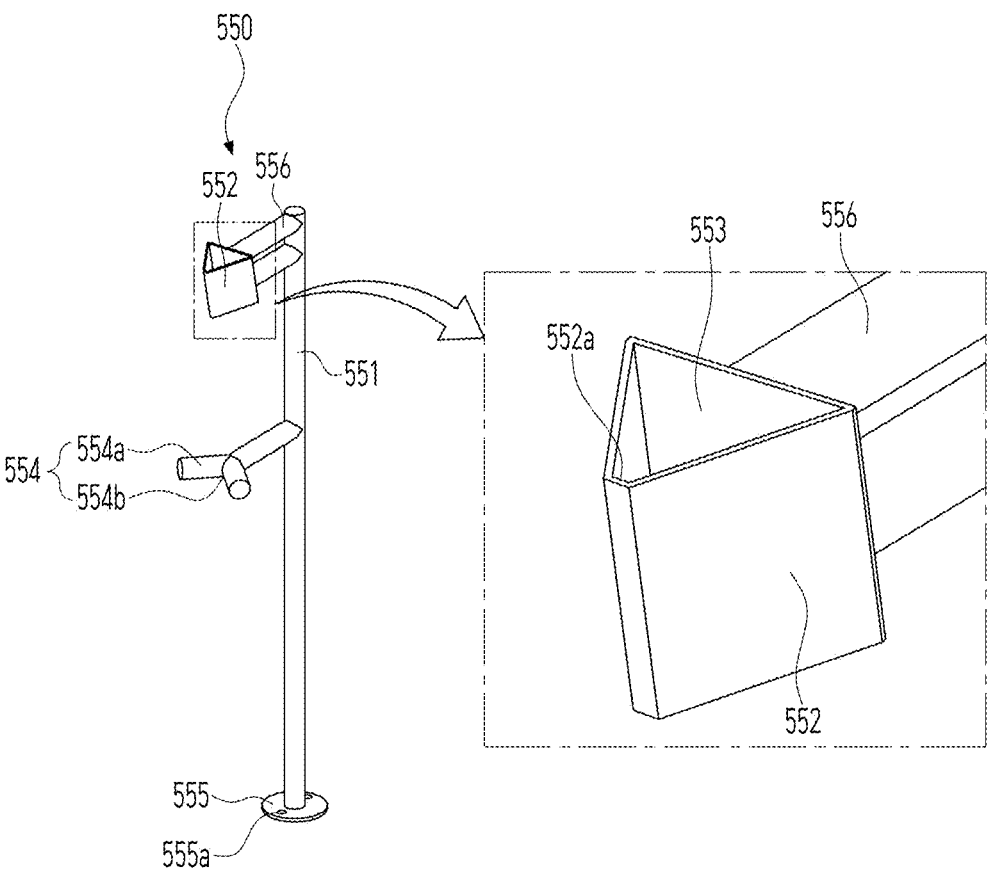

FIG. 10 is a diagram illustrating a holder according to some embodiments of the present disclosure.

Figure 11:
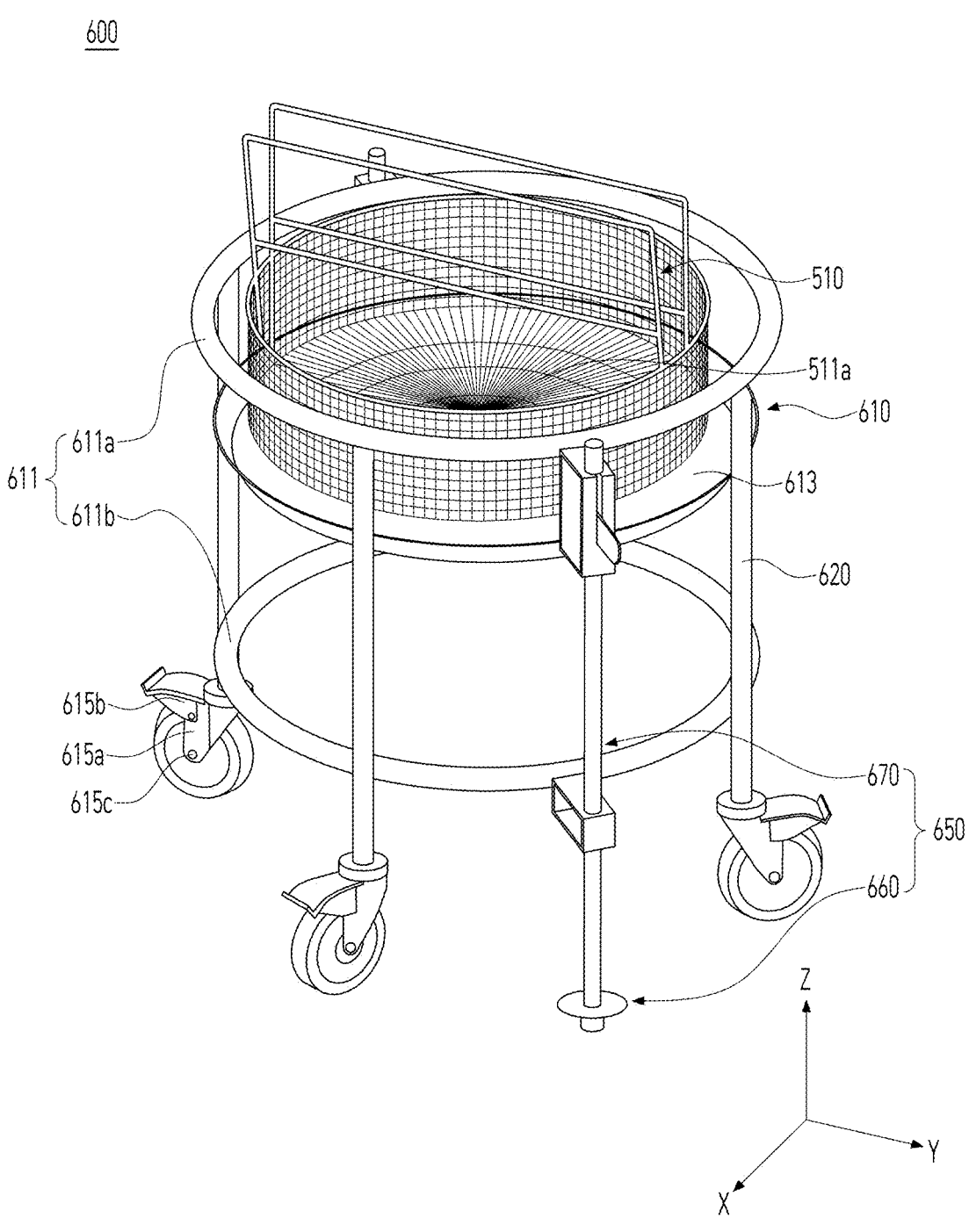

FIG. 11 is a diagram illustrating a tray cart according to some embodiments of the present disclosure.

Figure 12:
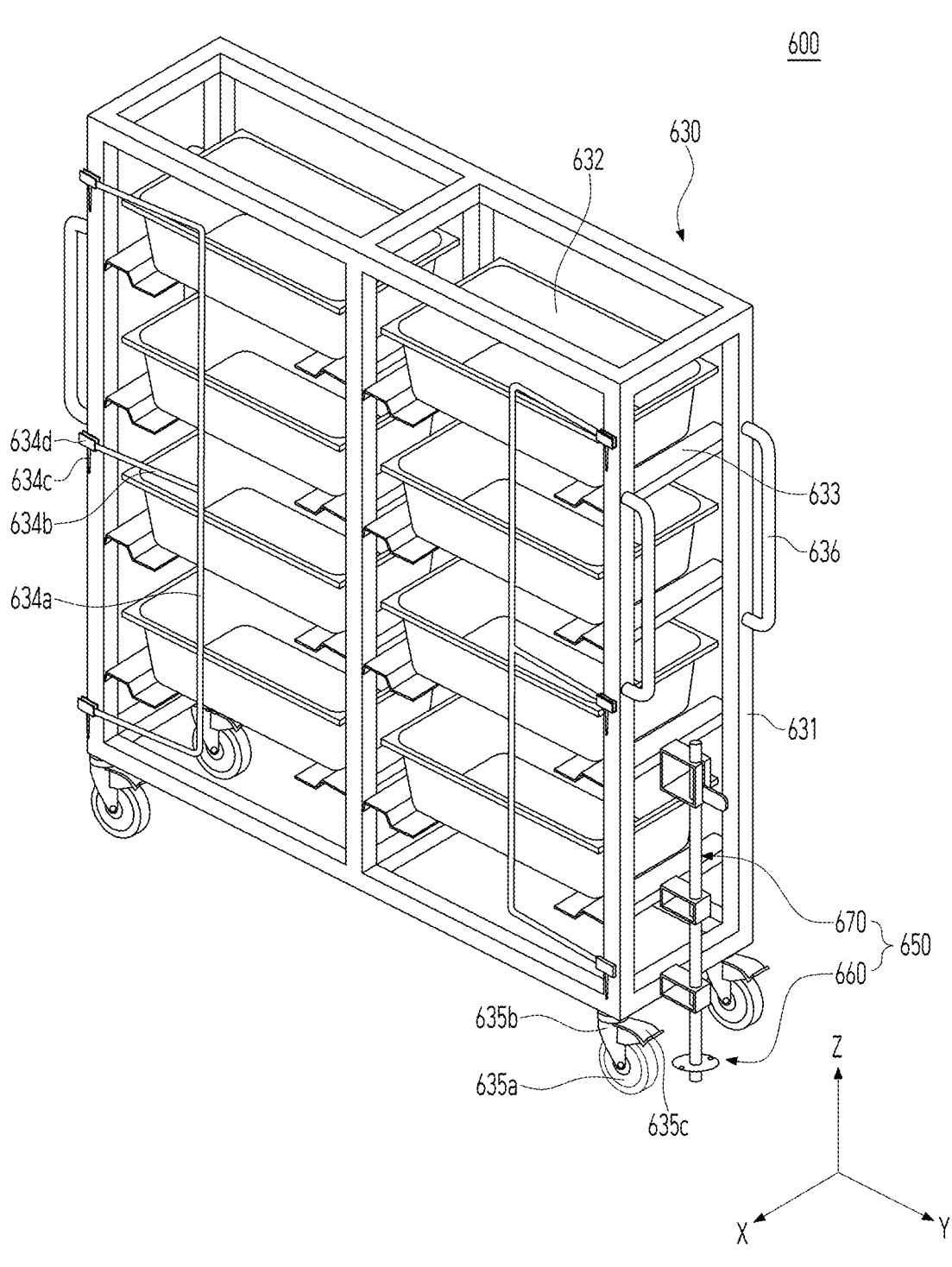

FIG. 12 is a diagram illustrating a vat cart according to some embodiments of the present disclosure.

Figure 13:
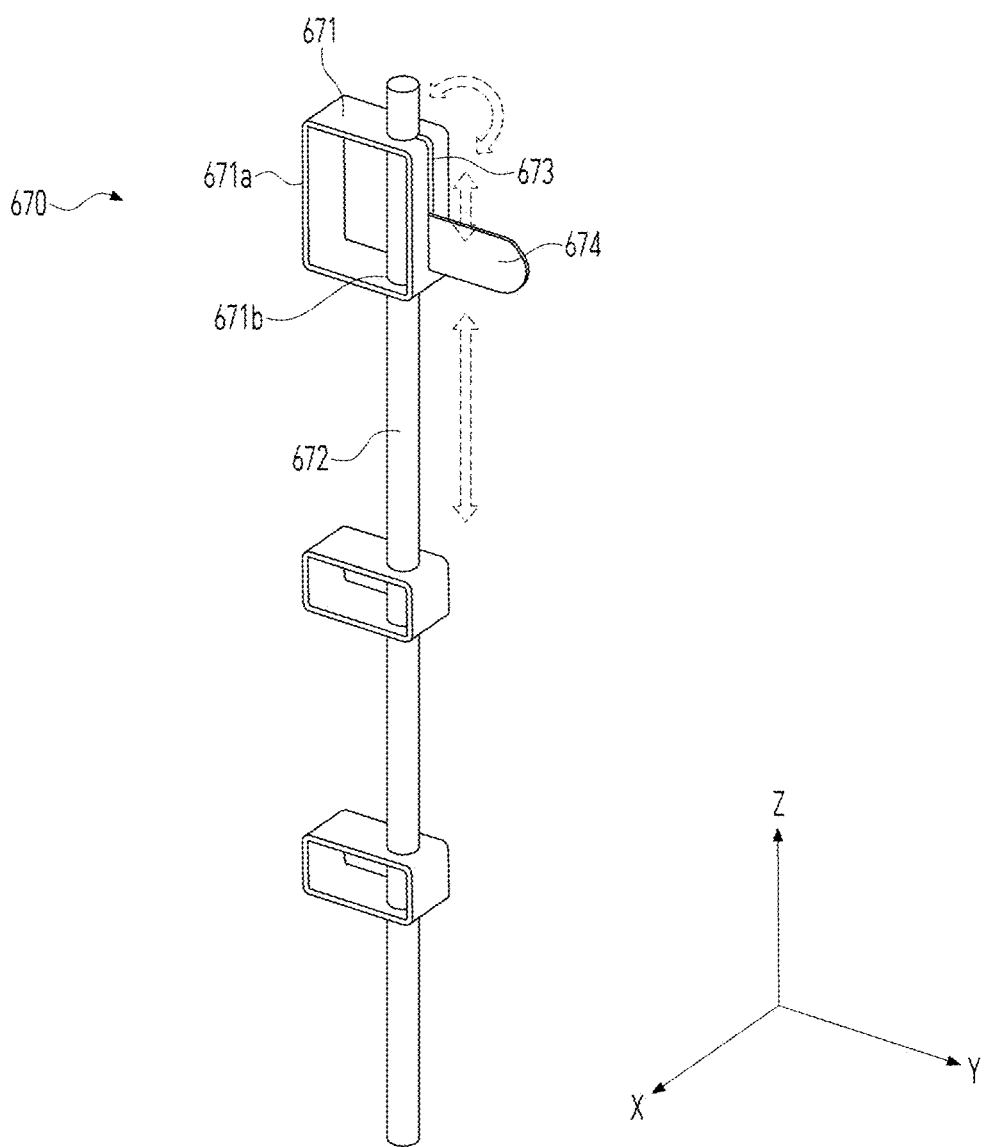

FIG. 13 is a diagram illustrating a locking operation unit according to some embodiments of the present disclosure.

Figure 14:
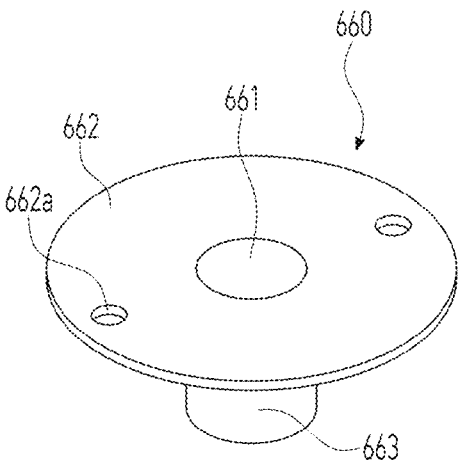

FIG. 14 is a diagram illustrating a locking base according to some embodiments of the present disclosure.

Figure 15:
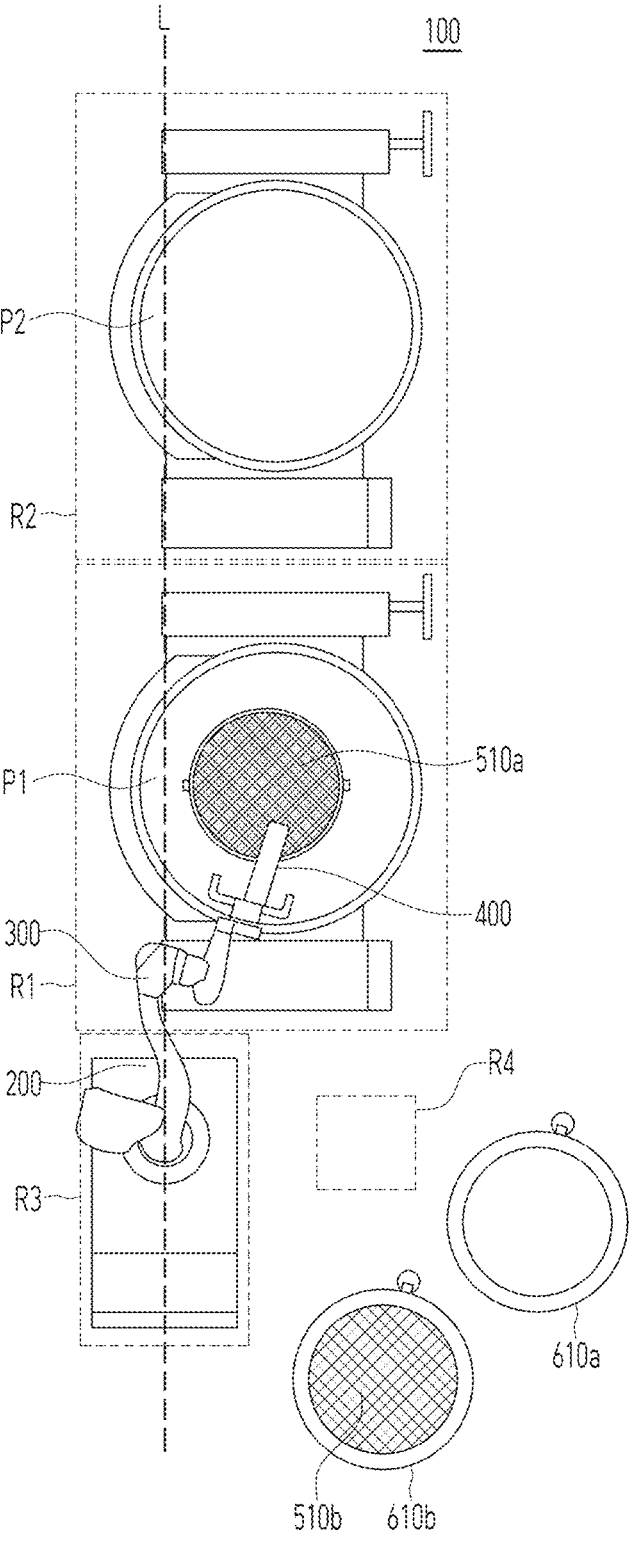

FIG. 15 is a diagram illustrating an example of a cooking robot system that performs large-capacity cooking using a plurality of kettles.

Figure 16:
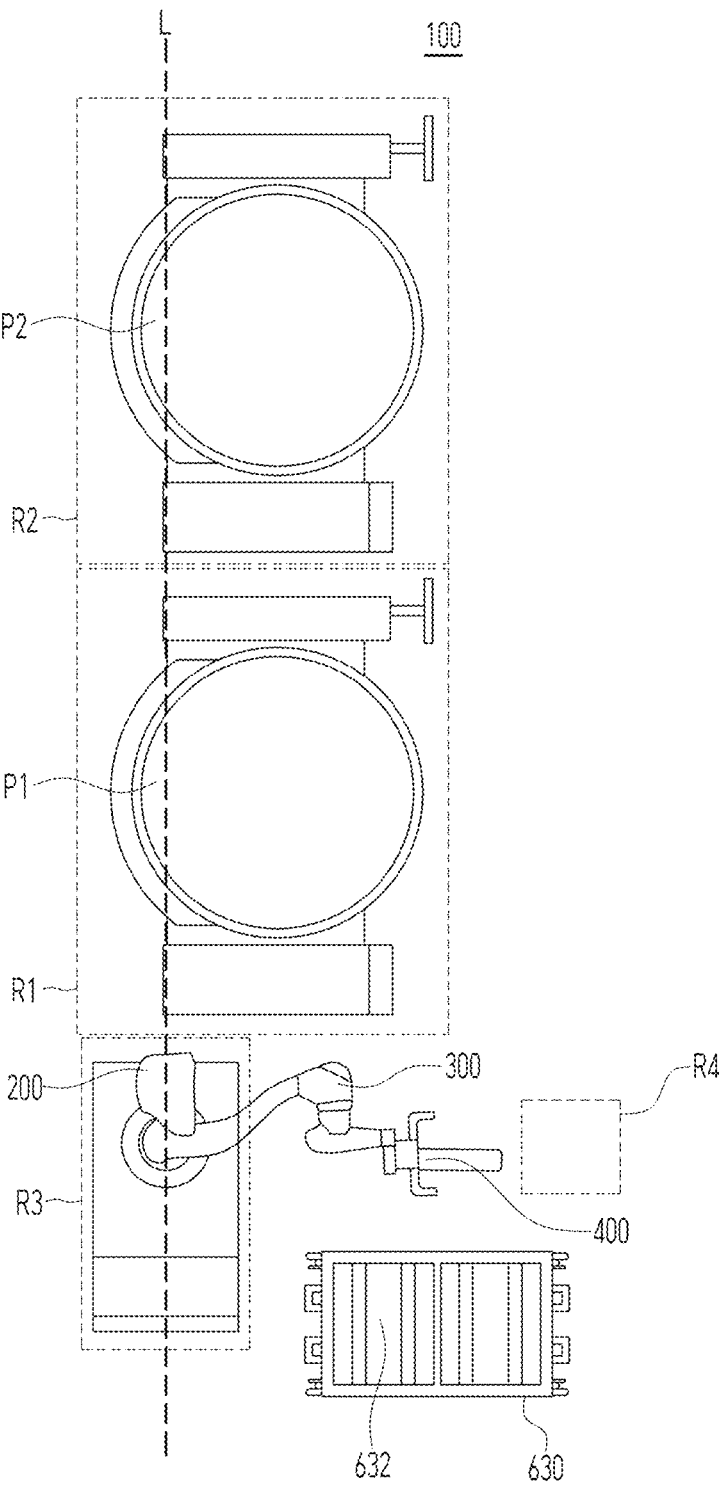

FIG. 16 is a diagram illustrating another example of a cooking robot system that performs large-capacity cooking using a plurality of kettles.

DETAILED DESCRIPTION

Hereinafter, various embodiments of the cooking robot system according to the present disclosure and a method of cooking food using the same will be described in detail with reference to the drawings. In the following description, the same reference numerals will be assigned to components that are the same or similar regardless of the drawing symbols, and redundant descriptions thereof will be omitted.

The objects and effects of the present disclosure, as well as the technical configurations for achieving them, will become apparent with reference to the embodiments described in detail below in conjunction with the accompanying drawings. In describing one or more embodiments of the present disclosure, detailed descriptions of related known technologies will be omitted when it is determined that they may obscure the gist of at least one embodiment of the present disclosure.

The terms used in the present disclosure are defined in consideration of the functions of the present disclosure, and may vary depending on the intent or convention of users or operators. Also, the accompanying drawings are provided only to facilitate the understanding of one or more embodiments of the present disclosure, and the technical spirit of the present disclosure is not limited by the drawings. It should be understood that all modifications, equivalents, and substitutes included in the spirit and scope of the present invention are encompassed.

In the following description, suffixes such as "module" and "unit" used for components are assigned or mixed merely for convenience in drafting the present disclosure, and they do not have meanings or roles that are distinct from each other by themselves.

Also, terms such as "user" and "cook" used in the following description are assigned or used interchangeably merely for convenience in drafting the present disclosure, and they do not have meanings or roles that are distinct from each other by themselves.

Terms including ordinal numbers such as "first" and "second" may be used to describe various components, but such components are not limited by these terms. These terms are used only for distinguishing one component from another. Thus, a first component mentioned below may be referred to as a second component within the technical spirit of the present disclosure.

When it is stated that one component is "connected" or "coupled" to another component, it should be understood that the components may be directly connected or coupled, or may be connected or coupled through another component in between. In contrast, when it is stated that a component is "directly connected" or "directly coupled" to another component, it should be understood that there is no other component in between.

Unless clearly indicated otherwise in the context, a singular expression shall be understood to include the plural as well. That is, unless explicitly stated or clearly evident from the context, the singular in the present disclosure and the claims is to be interpreted as "one or more."

In the present disclosure, terms such as "comprise," "include," "having," and the like are intended to specify the presence of stated features, numbers, steps, operations, components, parts, or combinations thereof, but do not preclude the presence or addition of one or more other features, numbers, steps, operations, components, parts, or combinations thereof.

The term "or" used in the present disclosure is to be interpreted as an inclusive "or," not an exclusive "or." That is, unless otherwise specified or clearly indicated by the context, "X uses A or B" is intended to mean that X uses A, or X uses B, or X uses both A and B. Also, the term "and/or" used in the present disclosure shall be understood to include all possible combinations of one or more of the listed items.

Unless otherwise defined, all terms (including technical and scientific terms) used in the present disclosure have the meanings commonly understood by those skilled in the art to which the present disclosure pertains. Terms defined in generally used dictionaries shall be interpreted as having meanings consistent with the relevant art, unless otherwise defined herein.

However, the present disclosure is not limited to the embodiments disclosed below, but may be embodied in various different forms. The following embodiments are provided only to fully convey the scope of the present disclosure to those skilled in the art, and the present disclosure is defined only by the scope of the claims. Therefore, definitions should be made based on the overall contents of the present disclosure.

Referring to FIG. 1, a cooking robot system 100 according to an embodiment of the present disclosure may include a robot base 200, a multi-joint robot 300, a gripper unit 400, a cooking utensil 500, an ingredient supply unit 600, and a kettle P. The components are not essential for implementing the cooking robot system 100, and the cooking robot system 100 described in the present disclosure may include more or fewer components than those listed above.

In the present disclosure, the cooking robot system 100 may be used to cook a large amount of food using multiple modes and may have multifunctionality to cook various types of food. Here, the multiple modes may include an automatic mode and a manual mode.

The kettle P may include an automatic water supply unit that fills the kettle with water through automatic water supply. The automatic water supply unit may include a water supply line, a water supply amount sensing unit, and an electric valve. The components described above may operate in conjunction with each other to control the supply of water to the kettle P. However, the present disclosure is not limited thereto.

The water supply line may serve to draw water from an external water storage or a tap water supply source, and for this purpose, water may be supplied through a hose. Here, the hose may be made of a material with excellent durability and stability so that stable water flow can be maintained even under high-pressure conditions. However, the present disclosure is not limited thereto.

A controller embedded in the robot base 200 may drive a power unit inside the robot base 200 to control movements of the multi-joint robot 300 and the gripper unit 400. In addition, the controller may control the kettle P to adjust the temperature of the kettle or the amount of water supplied to the kettle, and may check recipes stored in a storage to perform various types of cooking.

The electric valve controls the inflow of water and may operate by receiving a control signal from the controller via wired or wireless communication. For example, when the controller transmits an open signal to the electric valve, the electric valve may open to allow water to flow into the kettle, and when the controller transmits a close signal, the electric valve may close to block the water flow.

The water supply amount sensing unit may recognize the amount of water supplied into the kettle P.

In one example, the water supply amount sensing unit may measure the total weight of the contents introduced into the kettle using a weight sensor, and may indirectly calculate the amount of water based on the measured weight. In this case, a load cell may be used as the weight sensor, and when using the load cell, the total weight can be measured even if materials other than water are present inside the kettle P.

In another example, the water supply amount sensing unit may accurately check the amount of water supplied by directly measuring the flow of water through a flow sensor installed in the water supply line.

The above-described examples may be used individually or in combination, and appropriate sensors may be selected depending on the situation. The present disclosure is not limited to the above-described examples.

The automatic water supply unit may adjust an amount of water supplied to the kettle P so that a preset amount of water is filled in the kettle P. Specifically, the controller may transmit an open signal to the automatic water supply unit to supply a preset amount of water into the kettle P according to a prestored recipe. In this case, the electric valve may open so that water can be supplied into the kettle P through the water supply line. Then, when the controller recognizes through the water supply amount sensing unit that the preset amount of water has been supplied, it may transmit a close signal to the electric valve. In this case, the electric valve may be closed.

Although the present disclosure includes the components and operations described above, it may further include various modifications and additional components or operational methods.

In the present disclosure, various recipes may be stored in a storage, and the storage may be embedded in the robot base 200. The storage may efficiently manage and utilize various data and information necessary for cooking tasks, and may contribute to automating and accurately performing cooking operations by the multi-joint robot 300.

Specifically, the storage may include detailed information for each recipe. For example, each recipe may include detailed records of types and amounts of ingredients used, the amount of water supplied to the kettle, cooking sequence, cooking conditions according to temperature and time, and instructions for using cooking utensils.

Also, the storage may include cooking temperature information for the kettle (P) suitable for a specific food, thereby supporting the multi-joint robot 300 to perform tasks optimized for the cooking environment.

The recipes stored in the storage may be referenced in real time when the multi-joint robot 300 performs cooking tasks. The controller may control movements of the multi-joint robot 300 and the gripper unit 400 based on the stored data to automate the cooking process and to perform each cooking step accurately. For example, the controller may use the stored data to add specific ingredients at precise timings, monitor the temperature or condition of the food during cooking, make necessary adjustments, and control movements of the multi-joint robot 300 and the gripper unit 400 so that the cooking utensil grips and operates in the kettle (P). This may ensure consistent food quality.

Furthermore, new recipes may be added or existing recipes may be modified through a user-friendly interface. The user may manage recipes conveniently via a display connected to the robot base 200 or a mobile application, and utilize the multi-joint robot 300 for various dishes. Additionally, the storage may be linked to cloud-based data to automatically update the latest recipes or to share recipes with other users, thereby providing scalability.

The storage does not merely function as a recipe repository, but may also contribute to learning and performance improvement of the robot based on recipe data. For example, the storage may record and analyze data collected during the cooking process to derive optimal cooking methods, or may be used to improve algorithms for enhancing efficiency in repetitive tasks. This may enable continuous performance improvement of the multi-joint robot 300 and more precise cooking operations.

Meanwhile, the kettle (P) may operate with various types of heat sources to heat water or contents inside. Generally, an induction method or a gas burner method may be used to heat efficiently and reliably. However, the present disclosure is not limited thereto, and other heating methods may be used if necessary.

The induction method directly heats the kettle itself using electromagnetic induction. The gas burner method is a traditional heating method in which heat generated from gas combustion is transferred to the kettle. Other heating technologies such as electric heater, radiant heat, and steam heater methods may also be applied.

In the present disclosure, the controller may control a temperature of the kettle (P) so that the temperature of the water supplied into the kettle becomes a preset temperature according to a prestored recipe. In this case, the controller may monitor the water temperature in the kettle P using a temperature sensor described later, and control the temperature of the kettle by transmitting control signals appropriate for the heating method applied to the kettle.

The kettle (P) may include a temperature sensor for checking a temperature of water supplied into the kettle. The temperature sensor included in the kettle (P) may be of various types such as a thermocouple, RTD (resistance temperature detector), or NTC/PTC thermistor.

The temperature sensor may be installed in the center of the inside of the kettle to detect overall temperature changes without partial temperature deviation, or may be installed at the bottom of the kettle to quickly detect the temperature rise when water is being heated. It may be designed to maintain durability even in environments exposed to high temperatures.

In the present disclosure, the temperature sensor may be installed in a form that directly contacts the water, or in a non-contact manner by being attached to the wall surface of the kettle (P). A temperature sensor installed in direct contact with water may provide fast and accurate temperature measurements, while a non-contact type temperature sensor may offer advantages such as improved durability and ease of maintenance.

The temperature sensor may measure a temperature of at least one of the kettle (P) or the contents (e.g., water) introduced into the kettle in real time, and the controller may analyze this data to control the cooking process.

Specifically, the temperature sensor installed in the kettle (P) may detect cooking states such as water temperature. The temperature sensor may convert the detected temperature into an electrical signal and output it. The signal output from the temperature sensor may be transmitted to the controller in the robot base via wired or wireless communication. The controller may receive the signal from the sensor, convert it into digital data, and process it. In this process, an analog-to-digital converter (A/D converter) may be used to convert analog signals into digital signals. The converted digital data may be analyzed by the controller. The controller may monitor the received temperature data in real time and evaluate the current cooking state by comparing it with a preset reference temperature.

According to some embodiments of the present disclosure, the controller may continuously monitor a temperature of water supplied to the kettle P through a temperature sensor, and may perform a function of notifying the user when the temperature reaches a preset temperature.

Specifically, the controller may analyze real-time data received from the temperature sensor and determine whether the water temperature inside the kettle has reached a preset target temperature (e.g., 100° C.). If the temperature has reached the preset temperature, the controller may detect it and control an output unit to output a preset alert.

The output unit may be designed to deliver the alert in a way that is easily recognized by the user. For example, the output unit may output the alert in the form of sound (alarm sound), light (LED blinking), or a display message. Such alert methods may be implemented in combination or selectively, considering user convenience.

After the alert is output through the output unit, the controller may recognize that an automatic mode among the multiple modes is selected if an input is received to add ingredients according to the recipe, and may recognize that a manual mode is selected otherwise. That is, if an input to add ingredients is received from the cook within a preset time, the controller may recognize that the automatic mode is selected; otherwise, it may recognize that the manual mode is selected.

Meanwhile, the detailed contents of the alert may be defined by the user. For example, when a specific temperature is reached, a message such as "Water Boiling Complete" or "Target Temperature Reached" may be output, or additional instructions for further operations may be displayed. This may help the user manage the cooking process efficiently.

Furthermore, the controller may include a function to trigger additional operations simultaneously with outputting the alert. For example, when the water reaches the preset temperature, the controller may automatically stop heating or execute a command to proceed to the next cooking step. Such functions may support the automation of cooking operations and enhance convenience by minimizing user intervention.

As a result, the controller may not only monitor the information received from the temperature sensor, but also control the output unit to output a preset alert when the temperature of the water supplied to the kettle P reaches the preset temperature, or automatically adjust the cooking environment.

Meanwhile, when the controller recognizes that the currently selected mode among the multiple modes is the automatic mode, it may control movements of the multi-joint robot 300 and the gripper unit 400 to automatically cook food in the kettle P.

Meanwhile, the robot base 200 may be installed in a cooking facility, and a power unit and the controller configured to drive the multi-joint robot 300 may be disposed inside the robot base 200.

The controller embedded in the robot base 200 may drive the power unit inside the robot base 200 to control movements of the multi-joint robot 300 and the gripper unit 400. Here, the gripper unit 400 may have a structure capable of gripping a plurality of cooking utensils of different types.

In the present disclosure, the controller disposed in the robot base 200 may determine whether to rotate the gripper unit depending on a type of the cooking utensil used during cooking, so as to enable the cooking utensil to be gripped by the gripper unit.

For example, if the controller determines that a frying basket 510 is used for cooking, it may determine not to rotate the gripper unit to grip the frying basket 510. In this case, the power unit may position the first gripper 410 at the top and operate the multi-joint robot 300 so that the frying basket 510 is gripped by the gripper unit.

In another example, if the controller determines that a cooking utensil 500 shown in FIG. 5 or FIG. 7 is used for cooking, it may determine to rotate the gripper unit so that the second gripper 420 is positioned at the top to grip the cooking utensil 500. In this case, the power unit may rotate the gripper unit to position the second gripper 420 at the top, and operate the multi-joint robot 300 so that the cooking utensil 500 shown in FIG. 5 or FIG. 7 is gripped by the gripper unit.

In yet another example, if the controller determines that a basket 632 is used for cooking, it may determine not to rotate the gripper unit to grip the basket 632. In this case, the power unit may operate the multi-joint robot 300 to grip the basket 632 after positioning the first gripper 410 at the top without rotating the gripper unit.

The above examples are merely provided to explain the present disclosure, and the present disclosure is not limited to these examples.

The controller may transmit a control signal to the kettle P via wired or wireless communication. For this purpose, a communication unit for transmitting control signals may be embedded in the robot base 200. The controller may transmit necessary control signals to the kettle P through the communication unit embedded in the robot base 200.

The controller may control the temperature of the kettle P via control signals.

For example, if the kettle P is heated by an induction method, the controller may generate a signal for adjusting power to maintain the desired temperature, and transmit the signal via wired or wireless communication.

In another example, if the kettle P is heated by a gas burner method, the controller may transmit a signal via wired or wireless communication to adjust the heat intensity to maintain a specific temperature.

These examples are merely provided to explain the present disclosure, and the present disclosure is not limited to these examples.

The controller may also control an amount of water supplied to the kettle P via control signals. Detailed descriptions thereof are omitted since they have been described above in relation to the automatic water supply unit.

The multi-joint robot 300 may be disposed on the robot base 200, and its multiple joints may be coupled to allow movement in multiple directions and positions. Each joint of the multi-joint robot 300 may be equipped with a separate actuator, and each actuator may receive power from the power unit and have its rotation direction and amount determined by the controller, so that the joint can move in multiple directions and positions.

According to some embodiments of the present disclosure, the controller may recognize the currently selected mode after controlling the output unit to output the preset alert. The controller may determine whether to cook food in the kettle P, and, if it is determined to cook food, may control movements of the multi-joint robot and the gripper unit in conjunction with controlling the kettle P, depending on a type of a currently selected mode among multiple operation modes.

The controller may recognize that the automatic mode is selected when an input for adding ingredients is received from the cook within a preset time, and may recognize that the manual mode is selected otherwise. However, the present disclosure is not limited thereto, and either the automatic mode or the manual mode may be directly selected by the user.

The automatic mode is a mode that focuses on maximizing automation of the cooking process and minimizing the cook's intervention. When this mode is activated, the controller may perform automatic cooking operations in the kettle P by controlling movements of the multi-joint robot 300 and the gripper unit 400 in conjunction with controlling an amount of water supplied to the kettle P and a temperature of the kettle P. For example, the controller may control movements of the multi-joint robot 300 and the gripper unit 400 to automatically add ingredients into the kettle P according to a recipe, and to grip and operate a cooking utensil for stirring. Such an automatic mode can efficiently handle complex cooking processes and significantly reduce the user's workload, especially in environments where multiple tasks are required.

The manual mode is a mode designed to support the cook's manual control of the cooking process. When the manual mode is selected, the controller may automatically adjust an amount of water supplied to the kettle P and a temperature of the kettle P according to a recipe, but may not control movements of the multi-joint robot 300 and the gripper unit 400. In this case, the controller focuses on supplying the necessary amount of water to the kettle P and controlling the temperature of the kettle P, while the cooking operation is entirely performed by the cook. For example, the controller may adjust the amount of water supplied to the kettle P according to a prestored recipe and maintain a preset temperature of the kettle P to provide optimal cooking conditions, and the cook may directly handle ingredients and perform cooking operations based on such conditions. The manual mode provides an environment in which the user can more precisely control the cooking process or attempt creative cooking.

The controller may detect a currently activated mode among the multiple modes and execute different control logic depending on the mode. In the case of the automatic mode, movements of the multi-joint robot 300 and the gripper unit 400 may be precisely controlled so that cooking steps according to a recipe are performed in the kettle P. In contrast, in the manual mode, the multi-joint robot 300 and the gripper unit 400 may be deactivated, and the user's operations may be prioritized.

In this way, the structure in which the controller organically controls an amount of water supplied to the kettle P, the temperature of the kettle P, and the movements of the multi-joint robot 300 and the gripper unit 400 according to the mode can greatly improve the flexibility and efficiency of the cooking environment. By selecting an appropriate mode according to a specific recipe or work condition, the user may be provided with the option of automating or manually managing cooking operations.

As a result, the mode-based control system according to the present embodiment can provide a platform that supports both the automated cooking functions of the multi-joint robot 300 and the gripper unit 400, and the cook's creative manual cooking operations.

Meanwhile, although only one kettle is illustrated in FIG. 1, the present disclosure is not limited thereto, and a plurality of kettles may be provided. The robot base may be disposed between the plurality of kettles such that the multi-joint robot and the gripper unit may cook food alternately or simultaneously in the plurality of kettles. Alternatively, as illustrated in FIGS. 15 and 16, the robot base may be placed in a location where it can cook food using only one kettle. In such cases, the controller may determine whether to control movements of the multi-joint robot and the gripper unit in conjunction with controlling an amount of water and a temperature for each of the plurality of kettles.

In some embodiments of the present disclosure, food may also be cooked using a kettle with an agitator attached, in addition to the kettles illustrated. In this case, the controller may control the movements of the gripper unit and the multi-joint robot in conjunction with controlling the operation of the agitator, the temperature of the kettle, and the amount of water supplied to the kettle.

The gripper unit 400 may be coupled to the multi-joint robot 300 and may be configured to detachably hold cooking utensils 500. According to an embodiment of the present disclosure, the gripper unit 400 may selectively use one or more cooking utensils 500 among a plurality of cooking utensils 500 depending on the target food, and may perform cooking using the selected cooking utensil. The multi-joint robot 300 may cook various types of food, and to cook one of them, the gripper unit 400 may selectively use one cooking utensil among the plurality of utensils.

Referring to FIG. 2, the gripper unit 400 may include a gripper drive unit 430, a first gripper 410, and a second gripper 420.

The gripper drive unit 430 may include a coupling portion 431, a drive module 432, a first moving plate 433, and a second moving plate 434.

The drive module 432 may provide driving force to move the first and second grippers 410, 420 in the vertical direction. Various structures that allow the first and second grippers 410, 420 to move vertically may be applied inside the drive module 432. For example, although not shown in the figures, a motor, gearbox, and screw may be arranged and connected in the drive module 432 to transmit power and move the first and second grippers 410, 420 vertically.

The first moving plate 433 may have a rectangular plate shape, be arranged movably in the vertical direction (Z direction) on one side of the drive module 432, and the first gripper 410 may be coupled thereto. For example, although not shown in the drawings, the first moving plate 433 may be connected to a screw and may move vertically depending on the rotational direction of the screw.

The second moving plate 434 may also have a rectangular plate shape, be arranged movably in the vertical direction on one side of the drive module 432, and the second gripper 420 may be coupled thereto. For example, although not shown in the drawings, the second moving plate 434 may be connected to a screw and may move vertically depending on the rotational direction of the screw.

The coupling portion 431 may be disposed on the other side of the drive module 432 and may be coupled to an arm of the multi-joint robot 300. Various coupling structures may be designed for the coupling portion 431. Although not shown in the drawings, an electrical port for supplying power and signals to the drive module 432 may be disposed.

The first gripper 410 may be movably connected to the gripper drive unit 430.

The first gripper 410 may include a first link plate 411, a first link beam 412, a center bar 413, side bars 414, a center support piece 415, and side support pieces 416.

The first link plate 411 may have a rectangular plate shape and be coupled to the first moving plate 433.

The first link beam 412 may have one end connected to the first link plate 411, and the other end may protrude in the front direction (X). In one embodiment, the first link beam 412 may have an arch shape, but is not limited thereto. For example, to stably support the center bar 413 in the lengthwise direction (Y), a plurality of discontinuous first link beams 412 may be spaced in the Y direction and may connect the first link plate 411 and the center bar 413.

The center bar 413 may be connected to the other end of the first link beam 412 and may hold the cooking utensil 500. In one embodiment, the center bar 413 may have an elongated bar shape in the Y direction.

The side bars 414 may extend from both ends of the center bar 413 in the front direction (X) and be connected to hold the cooking utensil 500.

The center support piece 415 may extend downward from the center bar 413 and support the cooking utensil 500. The center support piece 415 may be inclined in the front direction (X) in which the side bar 414 extends. In one embodiment, the center support piece 415 may have a rectangular plate shape, but is not limited thereto.

The side support pieces 416 may extend downward from the side bars 414 and support the cooking utensil 500. The side support pieces 416 may be inclined in the direction (Y) facing the center bar 413. In one embodiment, the side support pieces 416 may have a rectangular plate shape, but are not limited thereto.

The second gripper 420 may be movably connected to a position opposite the first gripper 410 in the gripper drive unit 430.

The second gripper 420 may include a second link plate 421, a second link beam 422, a lower support plate 423, and a center support plate 424.

The second link plate 421 may have a rectangular plate shape and may be coupled to the second moving plate 434.

The second link beam 422 may have one end connected to the second link plate 421 and the other end may protrude in the front direction (X). In one embodiment, the second link beam 422 may be an arch shape longer than the first link beam 412, but is not limited thereto. For example, a plurality of separated second link beams 422 may be arranged to protrude in the front direction (X).

The lower support plate 423 may be disposed in the front direction of the second link beam 422 and may support the cooking utensil 500. In one embodiment, the lower support plate 423 may be a thin plate curved at the edges corresponding to the shape of the opposite end of the second link beam 422 but is not limited thereto.

The center support plate 424 may be disposed to protrude upward in the vertical direction (Z) from the upper part of the second link beam 422 and may support the cooking utensil 500. The center support plate 424 may be inclined in the rear direction (X) facing the center bar 413. In one embodiment, the center support plate 424 may be a thin rectangular plate, but is not limited thereto.

In one embodiment, the lower support plate 423 and the center support plate 424 may be formed integrally. In this case, the center support plate 424 may be bent at a predetermined angle with respect to the lower support plate 423 to be arranged as shown in FIG. 2. Alternatively, the lower support plate 423 and the center support plate 424 may be manufactured separately and welded together.

In FIG. 3, a state in which the gripper unit 400 grips the basket 632 is illustrated. The basket 632 shown in FIG. 3 may be a basket 632 loaded onto the vat cart 630 shown in FIG. 12.

Referring to FIG. 3, the basket 632 of the vat cart 630 may have an open top and an internal space that becomes narrower from top to bottom. That is, the side portion of the basket may have a trapezoidal shape that narrows from top to bottom.

Also, a basket rib 632b protruding outward along the circumference may be formed at the upper portion of the basket. In addition, the side portion 632a of the basket may have a downwardly inclined trapezoidal shape.

The gripper unit 400 may grip the basket as follows.

First, the drive module 432 operates so that the first moving plate 433 moves upward, and accordingly, the first gripper 410 coupled to the first moving plate 433 also moves upward.

At the same time, the second moving plate 434 moves downward, and accordingly, the second gripper 420 coupled to the second moving plate 434 also moves downward.

Then, the multi-joint robot 300 moves such that the basket 632 is positioned in the space between the first and second grippers 410 and 420.

The multi-joint robot 300 moves the gripper unit 400 toward the basket 632 until the side portion 632a of the basket contacts the center support plate 424.

Once the side portion 632a of the basket contacts the center support plate 424, the multi-joint robot 300 stops moving the gripper unit 400.

Next, the drive module 432 operates so that the first moving plate 433 moves downward and the second moving plate 434 moves upward.

As the first moving plate 433 moves downward, the first gripper 410 also moves downward, and the center bar 413 and the side bar 414 are seated on and fixed to the basket rib 632b.

At this time, the side support piece 416 and the center support piece 415 contact and fix to the inner surface of the basket.

As the second moving plate 434 moves upward, the second gripper 420 also moves upward, and the lower support plate 423 comes into contact with and supports the bottom of the basket.

At this time, the side portion of the basket is also supported in contact with the center support plate 424.

That is, the upper part of the basket is stably fixed by the first gripper 410, and the lower and side portions of the basket are stably fixed by the second gripper 420, so that the gripper unit 400 can stably grip and carry the basket.

Meanwhile, FIGS. 4 through 10 illustrate various cooking utensils 500 according to embodiments of the present disclosure.

Referring to FIG. 4, among the cooking utensils 500 according to embodiments of the present disclosure, a frying basket 510 may be used to perform large-capacity deep-frying.

The frying basket 510 may include a basket mesh 511 and a basket frame 512.

The basket mesh 511 may be configured to receive ingredients for frying. In one embodiment of the present disclosure, the basket mesh 511 may have a cylindrical shape with an open top, and the side and bottom portions may be surrounded by a mesh made of heat-resistant metal material.

A rounded portion 511a may be formed at the lower portion of the basket mesh 511 and may have a downwardly curved shape. In this case, the rounded portion 511a may have the same curvature as the inner bottom of the kettle P, so that during cooking, the lower portion of the basket mesh 511 may closely contact the bottom of the kettle P, allowing the ingredients to be fried effectively.

The rounded portion 511a is formed to protrude downward from the lower portion of the basket mesh 511, thereby allowing more frying ingredients to be accommodated, which is suitable for large-capacity frying.

The basket frame 512 may be connected to the upper portion of the basket mesh 511 and may be gripped by the gripper unit 400.

The basket frame 512 may include first bar 513, second bar 514, first lower crossbar 515, second lower crossbar 516, and upper crossbar 517.

The first bar 513 may be a beam bent in a rectangular shape, connected to the basket mesh 511, and arranged to protrude upward.

The second bar 514 may be a beam bent in a rectangular shape, disposed adjacent to the first bar 513 on the basket mesh 511, and arranged to protrude obliquely upward. Accordingly, when the gripper unit 400 grips the basket frame 512, the upper end of the second bar 514 may be fixed in contact with the lower side of the center bar 413.

The first lower crossbar 515 may be a thin beam extending across both sides of the first bar 513 and connecting the lower ends of both sides of the first bar 513. When the gripper unit 400 grips the basket frame 512, the first lower crossbar 515 may be seated on and fixed to the lower support plate 423 of the second gripper 420.

The second lower crossbar 516 may be a thin beam extending across both sides of the second bar 514 and connecting the lower ends of both sides of the second bar 514. When the gripper unit 400 grips the basket frame 512, the second lower crossbar 516 may be fixed in contact with the center support plate 424 of the second gripper 420. As described above, since the second bar 514 is disposed to incline upward in the Z direction, the upper end of the second bar 514 may be supported by the lower portion of the center bar 413, and the second lower crossbar 516 may be supported in contact with the center support plate 424.

The upper crossbar 517 may be a thin beam disposed in the front direction (X) and connect the upper end of the first bar 513 and the upper end of the second bar 514. When the gripper unit 400 grips the basket frame 512, the upper crossbar 517 may be fixed in contact with the side of the center support piece 415 of the first gripper 410.

Referring to FIG. 4, in an embodiment of the present disclosure, a pair of upper crossbars 517 may be disposed between a pair of center support pieces 415, and each of the upper crossbars 517 may be fixed in contact with the side of the center support piece 415.

Hereinafter, a method for gripping the frying basket 510 using the gripper unit 400 will be described.

The gripper unit 400 may grip the basket frame 512 of the frying basket 510 as follows. Here, the frying basket 510 may be seated on a tray plate 613 of a tray cart 610 shown in FIG. 11.

First, the drive module 432 operates to move the first moving plate 433 upward, and accordingly, the first gripper 410 coupled to the first moving plate 433 moves upward.

At the same time, the second moving plate 434 moves downward, and accordingly, the second gripper 420 coupled to the second moving plate 434 moves downward.

The multi-joint robot 300 moves such that the basket frame 512 is positioned between the first and second grippers 410 and 420. At this time, the position of the gripper unit 400 is adjusted such that the first gripper 410 is located above the first and second bars 513 and 514, and the second gripper 420 is located below the first and second lower crossbars 515 and 516.

The multi-joint robot 300 moves the gripper unit 400 toward the frying basket 510 until the second lower crossbar 516 contacts the center support plate 424.

Once the second lower crossbar 516 contacts the center support plate 424, the multi-joint robot 300 stops moving the gripper unit 400.

Then, the drive module 432 operates to move the first moving plate 433 downward and simultaneously move the second moving plate 434 upward.

As the first moving plate 433 moves downward, the first gripper 410 also moves downward, and the center bar 413 is seated on and fixed to the second bar 514.

At this time, a pair of upper crossbars 517 is positioned between a pair of center support pieces 415, and the side of each upper crossbar 517 is fixed in contact with the center support piece 415.

As the second moving plate 434 moves upward, the second gripper 420 moves upward, and the lower support plate 423 comes into contact with and supports the first and second lower crossbars.

At this time, since the second bar 514 is fixed in contact with the center support piece 415, and the second lower crossbar 516 is supported in contact with the center support plate 424, the frying basket 510 may also be fixed in the front-rear direction (X).

That is, the upper portion of the basket frame 512 is stably fixed by the first gripper 410, the lower portion is stably fixed by the second gripper 420, and movement in the front-rear direction (X) is restricted as the center support piece 415 fixes the second bar 514 and the center support plate 424 supports and fixes the second lower crossbar 516.

Accordingly, the gripper unit 400 can stably grip the frying basket 510 using the above-described method.

Referring to FIGS. 5 through 9, cooking utensils 500 for small-capacity frying, soup/stew, or stir-frying according to an embodiment of the present disclosure are disclosed.

The cooking utensil 500 may include a ladle base portion 520, a hanger portion 531, a detachable coupling 537, and a ladle portion 540.

The ladle base portion 520 may be a structure gripped by the gripper unit 400. The ladle base portion 520 may include a fitting block 521, a first base 522, a second base 524, a side base 523, and a ladle link rod 525.

The first base 522 may have a rectangular frame shape.

The second base 524 may also have a rectangular frame shape and may be spaced a certain distance apart from the first base 522.

In some embodiments, the second base 524 may be inclined toward the first base 522 from bottom to top. Based on a third direction (Z-axis), the inclination angle of the second base 524 (θ, see FIG. 7) may correspond to the inclination angle of the center support plate 424 (θ, see FIG. 2).

The side base 523 may connect both ends of the first base 522 and both ends of the second base 524. In some embodiments, since the second base 524 inclines toward the first base 522 from bottom to top, the overall shape of the side base 523 may be trapezoidal.

The fitting block 521 may connect the upper portions of the first base 522 and the second base 524, and a fitting hole 521a may be formed in the center to penetrate through.

The ladle link rod 525 may be an elongated rod. Its upper part may be connected to the first base 522, and a detachable coupling 537 may be disposed at the lower part.

When the multi-joint robot 300 moves to grip the ladle base portion 520 using the gripper unit 400, the lower part of the second base 524 may be fixed to the center bar 413 and the center support piece 415 of the first gripper 410.

Also, the lower part of the side base 523 may be fixed to the side bar 414 and the side support piece 416 of the first gripper 410.

The fitting hole 521a of the fitting block 521 may receive the lower support plate 423 of the second gripper 420.

The second base 524 may be supported in contact with the center support plate 424, thereby fixing the ladle base portion 520 to the gripper unit 400.

Referring to FIGS. 6 and 8, a method of gripping the ladle base portion 520 of the cooking utensil 500 by the gripper unit 400 is described.

The gripper unit 400 may grip the ladle base portion 520 of the cooking utensil 500 as follows. The cooking utensil 500 may be mounted on a holder 550.

First, the cooking robot system rotates the gripper unit 400 by moving the joints of the multi-joint robot 300. As a result, the second gripper 420 is positioned at the top and the first gripper 410 is positioned below the second gripper 420. Then, the drive module 432 operates to move the first moving plate 433 upward, and accordingly, the first gripper 410 coupled to the first moving plate 433 moves upward.

Simultaneously, the second moving plate 434 moves downward, and the second gripper 420 coupled to it also moves downward.

Then, the multi-joint robot 300 moves to insert the lower support plate 423 of the second gripper 420 into the fitting hole 521a of the fitting block 521. The lower support plate 423 is inserted into the fitting hole 521a until the second base 524 contacts the center support plate 424.

Next, the drive module 432 moves the first and second grippers 410 and 420 closer together. Alternatively, only the first gripper 410 may move toward the second gripper 420.

Accordingly, the lower part of the second base 524 is supported in contact with the center bar 413. At this time, the lower part of the second base 524 may be positioned at the boundary between the center bar 413 and the center support piece 415, thereby restricting movement in the front-rear direction (X).

Simultaneously, the lower part of the side base 523 is supported in contact with the side bar 414. In this case, the lower part of the side base 523 may be positioned at the boundary between the side bar 414 and the side support piece 416, thereby restricting movement in the lateral direction (Y).

As described above, the upper part of the ladle base portion 520 is fixed by the second gripper 420 inserted into the fitting hole of the fitting block 521, the side portion of the ladle base portion 520 is fixed by the center support plate 424 coming into contact with the second base 524, and the lower portion of the ladle base portion 520 is fixed by the center bar 413 and the side bar 414 coming into contact with the lower parts of the second base 524 and the side base 523, respectively.

Additionally, movement of the ladle base portion 520 in the front-rear direction (X) and lateral direction (Y) may be restricted by the lower part of the second base 524 being positioned at the boundary between the center bar 413 and the center support piece 415, and by the lower part of the side base 523 being positioned at the boundary between the side bar 414 and the side support piece 416.

Accordingly, the gripper unit 400 can reliably grip the cooking utensil 500 using the above method.

Meanwhile, the ladle portion 540 may be connected to the lower part of the ladle base portion 520 and may be used to cook ingredients.

The ladle portion 540 may include a ladle rod 541 and a cooking block 543.

The ladle rod 541 may be a long rod, and a ladle opening groove 542 into which the lower end of the ladle link rod 525 is inserted may be formed at the upper end.

The cooking block 543 may be disposed at the lower end of the ladle rod 541.

If small-capacity frying is to be performed, the cooking block 543 may be a mesh made of heat-resistant metal. That is, a ladle rod 541 with a mesh may be used by coupling it to the ladle base portion 520.

If soup/stew or stir-frying is to be performed, the cooking block 543 may be a mixing plate made of heat-resistant metal. That is, a ladle rod 541 with a mixing plate may be coupled to the ladle base portion 520. The mixing plate may be used to stir both broth and solid ingredients during soup/stew cooking, and to stir-fry various ingredients during stir-frying.

Referring to FIG. 9, the detachable coupling 537 may detachably connect the ladle base portion 520 and the ladle rod 541. In other words, a ladle rod 541 with a mesh or a ladle rod 541 with a mixing plate may be selectively coupled to the ladle base portion 520.

The detachable coupling 537 may include a detaching hole 538 and a spring pin 539.

The detaching hole 538 may be formed to penetrate through the upper part of the ladle rod 541.

The spring pin 539 may protrude radially from the lower part of the ladle link rod 525. Although not illustrated in the drawings, the spring pin 539 may include a spring and a pin. The spring may be embedded inside the ladle link rod 525, and the pin may be connected to the spring, such that it is inserted into or removed from the detaching hole 538 in accordance with the expansion and contraction of the spring.

When the user separates the ladle rod 541 from the ladle link rod 525, the user completely presses the spring pin 539 into the detaching hole 538 and then pulls the ladle rod 541. Accordingly, a lower portion of the ladle link rod 525 is disengaged from the ladle opening groove 542 of the ladle rod 541, and the ladle rod 541 and the ladle link rod 525 are separated.

When the user couples the ladle rod 541 and the ladle link rod 525, the user completely presses the spring pin 539 and inserts a lower portion of the ladle link rod 525 into the ladle opening groove 542 of the ladle rod 541. The spring pin 539, which has been compressed inside the ladle opening groove 542, is inserted to a position corresponding to the detaching hole 538, and then protrudes in a radial direction by the elastic force of the spring, whereby the ladle rod 541 and the ladle link rod 525 are coupled.

Referring to FIG. 9, the hanger portion 531 may be disposed on the ladle link rod 525, and the hanger portion 531 may be coupled to the holder 550 such that the cooking utensil 500 may be mounted on the holder 550.

The hanger portion 531 may include a hanger block 532, a hanger flat surface 533, and a hanger plate 534.

The hanger plate 534 may have a plate shape and may be connected to the ladle link rod 525.

The hanger block 532 may protrude downward from and be connected to the hanger plate 534. In an embodiment of the present disclosure, the hanger block 532 may have a triangular prism shape, but is not necessarily limited thereto.

The hanger flat surface 533 may be formed flat along a lengthwise direction of the hanger block 532 on one or more edges among a plurality of edges forming the hanger block 532.

The hanger flat surface 533 may guide a direction and position in which the cooking utensil 500 is mounted when the hanger block 532 of the hanger portion 531 is inserted into the holder groove 553 of the holder 550. This ensures that the cooking utensil 500 is always mounted in a designated direction and position on the holder 550. As a result, when the multi-joint robot 300 moves to the designated direction and position, the gripper unit 400 may be able to grip the ladle base portion 520.

Referring to FIG. 10, the holder 550 may be disposed in a cooking facility, and may mount the cooking utensil 500 by coupling with the hanger portion 531.

The holder 550 may include a holder frame 551, a holder connecting bar 556, a holder block 552, a holder flat surface 552a, a holder groove 553, a holder beam 554, and a holder base 555.

The holder base 555 may have a plate shape, and a fastening hole 555a may be formed therein. A fastening member such as a bolt or nail may pass through the fastening hole 555a and be coupled to the ground, thereby fixing the holder base 555 to the ground of the cooking facility.

The holder frame 551 may have an elongated rod shape and may be disposed to protrude upward from an upper portion of the holder base 555.

The holder connecting bar 556 may have a short rod shape and may be connected while inclined downward from an upper portion of the holder frame 551.

The holder block 552 may be connected to the holder connecting bar 556, and a holder groove 553 with an open upper portion may be formed. The hanger block 532 may be inserted into the holder groove 553.

At this time, the holder block 552 and the holder groove 553 may have a triangular prism shape that is larger than the hanger block 532.

The holder flat surface 552a may be formed on one or more edges, located at positions corresponding to the hanger flat surface 533, among a plurality of edges forming the holder block 552. The holder flat surface 552a may be formed flat along a lengthwise direction of the holder groove 553.

When the cooking utensil 500 is mounted by inserting the hanger block 532 into the holder groove 553, by inserting it such that the position of the hanger flat surface 533 matches the position of the holder flat surface 552a, the direction and position in which the cooking utensil 500 is mounted on the holder 550 may be consistently guided.

Accordingly, the cooking utensil 500 is always mounted on the holder 550 in a designated direction and position, and when the multi-joint robot 300 moves to the designated direction and position, the gripper unit 400 moves to a position corresponding to the ladle base portion 520, and the gripper unit 400 may grip the ladle base portion 520 without error.

The holder beam 554 may be disposed below the holder block 552 from the holder frame 551. When the cooking utensil 500 is mounted on the holder 550, the holder beam 554 may support a side portion of the ladle rod 541.

In an embodiment of the present disclosure, the holder beam 554 may include a first holder beam 554a and a second holder beam 554b that extend in directions opposite to each other. A side portion of the ladle rod 541 may be seated and supported between the first and second holder beams 554a and 554b.

According to some embodiments of the present disclosure, as the hanger portion 531 of the cooking utensil 500 is inserted into the holder groove 553 of the holder block 552 provided in the holder 550, the cooking utensil 500 is mounted in a designated direction and position, and when the multi-joint robot 300 moves to the designated direction and position, the gripper unit 400 may grip the cooking utensil 500 without error.

Meanwhile, FIGS. 11 to 13 illustrate an ingredient supply unit 600 and a locking member 650 according to embodiments of the present disclosure.

The ingredient supply unit 600 may supply cooking ingredients.

Referring to FIG. 11, the ingredient supply unit 600 may include a tray cart 610.

The tray cart 610 may transport the frying basket 510 and may supply cooking ingredients for frying.

The tray cart 610 may include a tray frame 611, a tray support beam 612, a tray plate 613, and a tray wheel assembly 615.

The tray support beam 612 may have an elongated rod shape and may be disposed in a vertical direction (Z).

The tray frame 611 may have a ring shape and may be arranged in multiple tiers at predetermined intervals along the vertical direction (Z) of the tray support beam 612. The tray frame 611 may include an upper tray beam 611a and a lower tray beam 611b. The upper tray beam 611a may be disposed above the tray plate 613 and may prevent the frying basket placed on the tray plate 613 from being released to the outside. The lower tray beam 611b may be disposed below the tray plate 613 and may connect the plurality of tray support beams 612.

The tray plate 613 may have a circular plate shape and may be disposed at an upper portion of the tray support beam 612. In an embodiment of the present disclosure, a central portion of the tray plate 613 may be formed as a concave curved surface in a downward direction, corresponding to the rounded portion 511a of the frying basket 510.

As described above, the basket mesh 511 of the frying basket 510 protrudes in a curved shape in a downward direction. If the tray plate 613 has a flat disc shape, a lower portion of the basket mesh 511 may not be stably seated. Therefore, by forming the central portion of the tray plate 613 in a curved shape corresponding to the rounded portion 511a of the basket mesh 511, the frying basket 510 may be stably seated on the upper portion of the tray plate 613.

The tray wheel assembly 615 may be disposed at a lower portion of the tray support beam 612, and may allow the tray cart 610 to move.

The tray wheel assembly 615 may include a tray wheel 615a, a tray wheel bracket 615b, and a tray wheel brake 615c.

The tray wheel bracket 615b may be connected to a lower portion of the tray support beam 612. The tray wheel 615a may be rotatably connected to the tray wheel bracket 615b via a rotation shaft. Although not shown in the drawings, a bearing may be disposed between the rotation shaft and the tray wheel 615a, thereby allowing smooth rotation of the tray wheel 615a.

The tray wheel brake 615c may be disposed on an upper portion of the tray wheel bracket 615b. When the user wants to prevent the tray wheel 615a from rotating, the user may lower the tray wheel brake 615c to bring it into contact with the tray wheel 615a, thereby preventing rotation of the tray wheel 615a. In this case, a position of the tray cart 610 may be fixed.

Referring to FIG. 12, the ingredient supply unit 600 may include a vat cart 630.

The vat cart 630 may transport a plurality of baskets and may supply various cooking ingredients such as those for deep-frying, soup/stew cooking, or stir-frying.

The vat cart 630 may include a shelf frame 631, a shelf handle 636, baskets, a shelf deck 633, a anti-disengagement unit 634, and a shelf wheel assembly 635.

The shelf frame 631 may be formed by combining a plurality of beams in a rectangular parallelepiped shape. Shelf handles 636 may be disposed on both sides of the shelf frame 631, and a user may move the vat cart 630 by gripping the shelf handles 636.

The shelf deck 633 may be arranged in multiple tiers along a vertical direction (Z) of the shelf frame 631, and baskets may be seated on the shelf deck 633.

A anti-disengagement unit 634 may be disposed on the shelf frame 631 and may prevent the baskets on the shelf deck 633 from being disengaged from the shelf frame 631 to the outside.

The anti-disengagement unit 634 may include a anti-disengagement beam 634a, a cross beam 634b, a seating block 634d, and an insertion beam 634c.

The anti-disengagement beam 634a may have an elongated beam shape and may be arranged in a vertical direction (Z) of the shelf frame 631.

The cross beam 634b may be connected to the anti-disengagement beam 634a and may be arranged in a lengthwise direction (Y) of the shelf frame 631.

The seating blocks 634d may be arranged in multiple tiers along the vertical direction of the shelf frame 631. Although not shown in the drawings, each seating block 634d may have a through-hole (not shown) formed therein.

The insertion beam 634c may be bent downward at an end of the cross beam 634b and may be inserted into the through-hole of the seating block 634d.

When the anti-disengagement beam 634a is removed from the shelf frame 631, the user may lift the cross beam 634b upward, whereby the insertion beam 634c is withdrawn from the through-hole of the seating block 634d. Thereafter, the basket may be in a state where it can be taken out from the shelf deck 633.

The shelf wheel assembly 635 may be disposed on a lower portion of the shelf frame 631, and may allow the vat cart 630 to move.

The shelf wheel assembly 635 may include a shelf wheel 635a, a shelf wheel bracket 635b, and a shelf wheel brake 635c.

The shelf wheel bracket 635b may be connected to a lower portion of the shelf frame 631. The shelf wheel 635a may be rotatably connected to the shelf wheel bracket 635b via a rotation shaft. Although not shown in the drawings, a bearing may be disposed between the rotation shaft and the shelf wheel 635a to allow smooth rotation of the shelf wheel 635a.

The shelf wheel brake 635c may be disposed on an upper portion of the shelf wheel bracket 635b. When the user wishes to prevent the shelf wheel 635a from rotating, the user may lower the shelf wheel brake 635c to bring it into contact with the shelf wheel 635a, thereby preventing the shelf wheel 635a from rotating. In this case, a position of the vat cart 630 may be fixed.

Meanwhile, referring to FIGS. 13 and 14, the locking member 650 may be disposed in association with the ingredient supply unit 600 and the floor surface of the cooking facility, and may fix a position of the ingredient supply unit 600. By using the locking member 650 to fix the ingredient supply unit 600 at a designated position, the multi-joint robot 300 may move, and the gripper unit 400 may grip and transport a basket at the designated position.

The locking member 650 may include a locking base 660 and a locking operation unit 670.

The locking base 660 may be fixed to the floor surface of the cooking facility.

The locking base 660 may include a fixing block 663, a top plate 662, and a locking hole 661.

The fixing block 663 may protrude downward and may be inserted into the floor surface of the cooking facility.

The top plate 662 may have a disc shape, may be disposed on an upper portion of the fixing block 663, and may be seated on the floor surface of the cooking facility. A fastening hole 662a may be formed in the top plate 662, and a fastening member such as a bolt or nail may be inserted into the fastening hole 662a and fixed to the floor surface.

A locking groove may be formed in a downwardly recessed shape at a position of the top plate 662 corresponding to the fixing block 663.

The locking operation unit 670 may be coupled to the ingredient supply unit 600, and may be coupled to the locking base 660 to fix a position of the ingredient supply unit 600.

The locking operation unit 670 may include a locking frame 671, a locking beam 672, a locking handle 674, and a handle hole 673.

The locking frame 671 may have a rectangular block shape and may have a beam hole 671b penetrating therethrough. A flat coupling surface 671a may be formed on one surface of the locking frame 671, and the coupling surface 671a may be coupled to the ingredient supply unit 600. In the case of the tray cart 610, the coupling surface 671a may be coupled to the tray frame 611, and in the case of the vat cart 630, it may be coupled to a side portion of the shelf frame 631. And the locking frame 671 may be arranged in plurality along the lengthwise direction of the locking beam 672, and each may be coupled to the ingredient supply unit 600.

The locking beam 672 may have an elongated rod shape, may pass through the beam hole 671b, and may be disposed in a vertical direction.

The locking handle 674 may have a plate shape and may be connected to an upper portion of the locking beam 672.

The handle hole 673 may be formed in the locking frame 671 in the vertical direction (Z), and the locking handle 674 may ascend and descend along the vertical direction.

When the user wants to fix the position of the ingredient supply unit 600, the user may grip the locking handle 674, rotate it, and lower it along the handle hole 673. Then, the locking beam 672 connected to the locking handle 674 moves downward and may be inserted into the locking hole 661. Accordingly, the ingredient supply unit 600 may be fixed at the designated position.

When the user wants to move the ingredient supply unit 600, the user may grip the locking handle 674, lift it upward along the handle hole 673, and then rotate it. Then, the locking beam 672 connected to the locking handle 674 moves upward. Thereafter, the locking handle 674 is fixed in a state seated on the upper portion of the locking frame 671, so the locking beam 672 does not move downward. In this case, since the locking beam 672 is in a state of being disengaged from the locking hole 661, the user may push and move the ingredient supply unit 600.

Hereinafter, a food cooking method using the cooking robot system 100 according to an embodiment of the present disclosure will be described. The detailed operation method applied to each component of the cooking robot system 100 in each food cooking method may refer to the above description.

Meanwhile, according to some embodiments of the present disclosure, the cooking robot system 100 may perform large-capacity cooking using a plurality of kettles. Hereinafter, with reference to FIGS. 15 and 16, a description will be given of performing deep-frying, stir-frying, or soup/stew cooking using the cooking robot system 100 including a plurality of kettles.

Referring to FIGS. 15 and 16, a first kettle P1 may be installed to be fixed to a first region R1 of the floor of the cooking facility. Specifically, the first kettle P1 may be firmly fixed to the floor of the cooking facility using anchor bolts to prevent movement or shaking during cooking. The anchor bolts ensure the stability of the first kettle P1 and are designed to enable stable cooking without equipment movement. However, the present disclosure is not limited to the fixing method using anchor bolts and may also employ other methods (e.g., fixing plates, adhesive supports, etc.).

A second kettle P2 may be installed to be fixed to a second region R2 of the floor of the cooking facility. Specifically, the second kettle P2 may also be firmly fixed to the floor using anchor bolts to prevent movement or shaking during cooking. The anchor bolts ensure the stability of the second kettle P2 and allow stable cooking without equipment movement. However, the present disclosure is not limited to the fixing method using anchor bolts and may also employ other methods (e.g., fixing plates, adhesive supports, etc.).

If the first kettle P1 and the second kettle P2 are not fixed to the floor, there is a risk that the equipment may move or shake during the process of cooking a large amount of food or mixing contents. This may not only reduce the accuracy and efficiency of cooking, but also cause safety accidents. Therefore, the first kettle P1 and the second kettle P2 must be firmly fixed to the floor. This also applies to the case where only one kettle is present, as in FIG. 1.

The first kettle P1 and the second kettle P2 may include an automatic water supply unit that fills water into the kettles automatically. The details regarding the kettle P including an automatic water supply unit are described above with reference to FIG. 1, and are equally applicable to the first kettle P1 and the second kettle P2. Thus, a detailed explanation will be omitted.

The first kettle P1 and the second kettle P2 may operate with various heat sources to heat water or contents inside. The details regarding the operation of the kettle P with various heat sources are described above with reference to FIG. 1 and are equally applicable to the first kettle P1 and the second kettle P2. Thus, a detailed explanation will be omitted.

The controller may continuously monitor a water temperature of at least one of the first kettle P1 and the second kettle P2 via a temperature sensor, and may perform a function of notifying a user when the temperature reaches a preset value. In this regard, the above description with reference to FIG. 1 may be applied.

The controller may transmit control signals to the first kettle P1 and/or the second kettle P2 via wired or wireless communication. For this purpose, a communication unit for transmitting the control signals may be built into the robot base 200. The controller may transmit necessary control signals to the first kettle P1 and/or the second kettle P2 via the communication unit built into the robot base 200.

The controller may control a temperature of the first kettle P1 and a temperature of the second kettle P2 through the control signals.

For example, if the first kettle P1 and/or the second kettle P2 is heated by an induction method, the controller may generate a signal to adjust power to maintain a desired temperature and transmit it via wired or wireless communication.

In another example, if the first kettle P1 and/or the second kettle P2 is heated by a gas burner method, the controller may transmit a signal to adjust heat level via wired or wireless communication to control the temperature.

Even when the heating methods of the first kettle P1 and the second kettle P2 are different, the controller may independently transmit control signals appropriate for each kettle. For example, when the first kettle P1 is heated using an induction method, the controller may generate and transmit a power adjustment signal, and when the second kettle P2 is heated using a gas burner method, the controller may generate and transmit a flame adjustment signal.

The above examples are provided for illustrative purposes of the present disclosure, and the present disclosure is not limited thereto.

The robot base 200 may be installed to be fixed in a third region R3 to stably support the multi-joint robot 300 that performs large-capacity cooking. Specifically, the robot base 200 is mainly fixed firmly to the floor of the cooking facility using anchor bolts, thereby effectively preventing vibration or movement during operation. However, the present disclosure is not limited to the fixing method using anchor bolts and may adopt adhesive plates, special supports, or mobile yet safe structures depending on the situation. The multi-joint robot 300 may be coupled to the robot base 200 and perform various cooking operations. The multi-joint robot 300 is used for tasks such as mixing or transferring a large amount of ingredients, or automating precise cooking processes. If the robot base 200 is not stably fixed in the third region R3, the base may shake or move due to loads and movements of the robot during operation. This not only lowers the accuracy and efficiency of the cooking process but also increases the risk of safety accidents, especially when people are around. Particularly for large robots, any disengagement may cause serious human injury, so securing the robot base is very important.

The robot base 200 must be fixed at a predetermined position in the third region R3 so that the robot can maintain stability and precision during operations.

In the present disclosure, the first kettle P1 may be installed to be fixed in the first region R1, the second kettle P2 may be installed to be fixed in the second region R2, and the robot base 200 may be installed to be fixed in the third region R3. Here, the first region R1, the second region R2, and the third region R3 may exist on the same virtual line L.

When the first region R1, the second region R2, and the third region R3 are arranged on the same virtual line L, there are various operational and structural advantages.

First, a linear arrangement simplifies the physical relationships between the robot base 200, the first kettle P1, and the second kettle P2, increasing efficiency in system design and installation. The linear layout maximizes space utilization, minimizes interference among devices, and improves system stability and operational efficiency. It contributes to clearly defining the motion path and working range of the multi-joint robot 300 and prevents unexpected collisions or interference.

Second, the linear layout is advantageous in terms of maintenance and management. Since each component is aligned, equipment accessibility improves, facilitating maintenance work and enabling quick response when problems occur. Also, in designing wiring or communication lines between components, linear arrangement reduces complexity and enables cleaner and more efficient configuration of infrastructure such as cable routing and power supply.

Third, the linear layout may have a positive effect on user experience. If the machines and equipment are arranged intuitively in the workspace, it reduces confusion when users operate the equipment or control the robot. Especially in environments such as kitchens where cooking occurs, the linear layout simplifies user movement and naturally induces the required workflow, enhancing productivity.

Fourth, the linear layout increases the scalability of the automated cooking system. For example, when adding additional cooking equipment or robots along the same line, compatibility with the existing system is high, making integration easy. This provides flexibility for future technology upgrades or equipment expansion and contributes to securing economic efficiency of the system in the long term.

Therefore, a layout designed along the same virtual line provides optimal arrangement considering both structural simplicity and functional efficiency, and offers significant advantages in terms of space utilization, maintenance, user convenience, and scalability.

Meanwhile, the first region R1 may exist between the second region R2 and the third region R3. Such an arrangement may clarify the division of roles between the multi-joint robot 300 and the cook, and contribute to maximizing simultaneity and independence of cooking operations in the workspace.

Specifically, the third region R3 may be located at a first distance from the first region R1 such that the multi-joint robot 300 can cook food in the first kettle P1, but may be located at a second distance far enough that cooking in the second kettle P2 is not possible. Here, the first distance may be shorter than the entire length of the multi-joint robot 300, and the second distance may be longer than the entire length of the multi-joint robot 300. Therefore, the multi-joint robot 300 can sufficiently perform cooking in the first kettle P1 but cannot perform cooking in the second kettle P2.

When the first region R1 is located between the second region R2 and the third region R3, the working efficiency of the multi-joint robot 300 is improved. The first kettle P1 located in the first region R1 serves as a cooking-only zone for the robot, and the robot secures a suitable distance and position to perform cooking within this zone. This contributes to optimizing the robot's motion range and reducing unnecessary movement or inefficiencies in the work path.

The separation between the second region R2 and the first region R1 may provide spatial flexibility for the cook to perform independent cooking operations in the second kettle P2. While the multi-joint robot 300 performs cooking in the first kettle P1, the second kettle P2 can be used exclusively by the cook, allowing simultaneous work without interference. This increases productivity and supports efficient handling of complex tasks such as multi-menu preparation.

Additionally, by positioning the first region R1 in the middle, the work flow can be organized systematically. The robot performs tasks following an optimized path from the third region R3 to the first kettle P1, and the cook works along a separate path in the second region R2, thereby improving space utilization and workflow. This layout particularly enables a collaborative environment even in compact spaces.

The first region R1 may act as a physical buffer zone between the robot and the cook, thereby enhancing safety and work quality. For example, even if the multi-joint robot 300 behaves unexpectedly during operation, since the first region R1 is separated from the second region R2, it minimizes the impact on the cook's tasks. This helps reduce the risk of accidents and ensures stability in cooking operations.

Furthermore, placing the first region R1 in the middle facilitates system expansion and operational management. For instance, since the second region R2 and the third region R3 are independently defined, it is possible to expand or replace the second kettle P2 or the multi-joint robot 300 with minimal impact on other components. This contributes to improving long-term maintenance and operational efficiency.

In conclusion, designing the first region R1 to be located between the second region R2 and the third region R3 can provide an environment where the multi-joint robot 300 and the cook can work independently and efficiently in their respective work areas.

Meanwhile, FIGS. 15 and 16 describe the positions of the first kettle P1, the second kettle P2, and the robot base 200 as being limited to the first region R1, the second region R2, and the third region R3, but the present disclosure is not necessarily limited thereto, and the positions of the first kettle P1, the second kettle P2, and the robot base 200 may be changed to other locations.

The controller may control at least one of an amount of water supplied to the second kettle P2 and a temperature of the second kettle P2 separately from controlling at least one of an amount of water supplied to the first kettle P1 and a temperature of the first kettle P1.

For example, while automatically controlling the temperature of the first kettle P1 and performing cooking in the first kettle P1 using the multi-joint robot 300 and the gripper unit 400, the controller may also automatically control the temperature of the second kettle P2 to support the cook in independently cooking in the second kettle P2. In this case, the controller may control the temperature of the second kettle P2 separately from the temperature control of the first kettle P1. That is, the controller may set different temperatures for the first kettle P1 and the second kettle P2.

In another example, the controller may control the amount of water supplied to the second kettle P2 separately from the amount of water supplied to the first kettle P1. In this case, the controller may set different amounts of water supplied to the first kettle P1 and the second kettle P2.

In yet another example, the controller may control both the amount of water supplied to and the temperature of the second kettle P2 separately from controlling the amount of water supplied to and the temperature of the first kettle P1.

As described above, independently controlling multiple kettles enables efficient processing of complex cooking processes and significantly reduces the workload in environments requiring multi-tasking.

The controller may recognize a currently selected mode among a plurality of modes, and in conjunction with controlling the first kettle P1, may control movements of the multi-joint robot and the gripper unit to determine whether to perform cooking in the first kettle P1, and separately control the second kettle P2.

FIG. 15 is a diagram for describing performing deep-frying in the first kettle P1.

Referring to FIG. 15, the cook may select a recipe related to deep-frying stored in the storage to operate the cooking robot system 100. In this case, the cook may prepare ingredients for deep-frying and place them into a first frying basket 510a and a second frying basket 510b. Then, the cook may load the first frying basket 510a and the second frying basket 510b into a first tray cart 610a and a second tray cart 610b, and move the first tray cart 610a and the second tray cart 610b into the cooking facility. Detailed descriptions of the first tray cart 610a and the second tray cart 610b have been provided above with reference to FIG. 11, and thus will not be repeated here.

The cook may move the tray carts 610a and 610b to designated positions and then fix the tray carts 610a and 610b using the locking member 650. In order for the multi-joint robot 300 to stably grip the frying baskets 510a and 510b, the tray cart 610 must be fixed at the designated position.

Specifically, a plurality of locking bases 660 may be installed on the floor surface of the cooking facility. The first tray cart 610a and the second tray cart 610b may be provided with a locking operation unit 670. The cook may move the first tray cart 610a and the second tray cart 610b to a location where the locking bases 660 are installed, and then allow the locking beam 672 of the locking operation unit 670 to be inserted into the locking bases 660. In this case, the first tray cart 610a and the second tray cart 610b may be fixed at designated positions. Specifically, the first tray cart 610a may be positioned at a first designated position, and the second tray cart 610b may be positioned at a second designated position.

More specifically, referring to FIGS. 13 and 14, the cook grips and rotates the locking handle 674 so that the locking handle 674 moves in the vertical direction (Z) to a position corresponding to the handle hole 673.

Then, the user grips the locking handle 674 and moves it downward along the handle hole 673, so that the locking beam 672 descends along the beam hole 671b and is inserted into the locking hole 661 of the locking base 660. Accordingly, the tray carts 610a and 610b can be fixed at designated positions. That is, as disclosed in FIG. 15, the first tray cart 610a and the second tray cart 610b can be fixed at the first and second designated positions (the first designated position and the second designated position), respectively, using the locking member 650.

The first designated position and the second designated position may be located at positions appropriately spaced from the third region R3 so that the multi-joint robot 300 can grip the first frying basket 510a placed on the first tray cart 610a and the second frying basket 510b placed on the second tray cart 610b.

In the present disclosure, the tray carts 610a and 610b must have a structure that allows movement through the tray wheel assembly 615 when transporting ingredients or food. However, after transportation is completed, they must be fixed to restrict movement in order to reduce the risk of personal injury and also reduce the problem of food or ingredients spilling.

In the present disclosure, the tray carts 610a and 610b must always be fixed at the same position. If the positions where the tray carts 610a and 610b are fixed differ, additional sensors such as a vision sensor must be added to the cooking robot system to identify the position of the tray carts 610a and 610b, which can increase the manufacturing cost of the cooking robot system. To solve this problem, according to some embodiments of the present invention, the locking bases 660 may be installed at positions on the floor of the cooking facility corresponding to the first and second designated positions. Therefore, the tray carts 610a and 610b can always be fixed at the same positions.

The cook may add oil to the first kettle P1 and the second kettle P2. However, the present disclosure is not limited thereto, and the oil may be filled into the first kettle P1 and the second kettle P2 through automatic oil supply.

If it is input that the cook performs deep-frying in the first kettle P1, the controller may control the first kettle P1 so that the temperature of the first kettle P1 reaches a temperature for deep-frying (for example, 180 degrees Celsius). Specifically, the controller may transmit a control signal for controlling the first kettle P1 to reach the temperature for deep-frying via wired or wireless communication to the first kettle P1. However, the present disclosure is not limited thereto.

The controller may check, through a temperature sensor, whether the temperature of the oil in the first kettle P1 has reached the temperature for deep-frying. If the controller recognizes that the temperature of the oil in the first kettle P1 has reached the temperature for deep-frying, it may control the output unit to output a preset notification. In this case, the cook may determine whether to cook in the first kettle P1 using the gripper unit 400 and the multi-joint robot 300 or to cook directly in the first kettle P1. That is, a preset notification may be output to allow the cook to select which mode to perform cooking among a plurality of modes (automatic mode and manual mode).

If the controller recognizes that the manual mode among the plurality of modes is selected, it may control the temperature of the first kettle P1 and may not control the movements of the multi-joint robot 300 and the gripper unit 400. In this case, the cook may directly cook food through deep-frying in the first kettle P1.

Meanwhile, in order to allow the cook to directly cook food through deep-frying in the first kettle P1, the multi-joint robot 300 and the gripper unit 400 may move to or be fixed at a position that does not interfere with the cook's operation.

Specifically, the controller may control the movements of the multi-joint robot 300 and the gripper unit 400 so that they do not invade the cook's working area. To this end, the multi-joint robot 300 may retreat to the outside of the cooking space or move to a specific standby position. Meanwhile, the multi-joint robot 300 may move while folding or unfolding its arms and joints to occupy a minimal space.

In the case of the gripper unit 400, it may be safely fixed at a specific point. Also, the operation speed may be adjusted or designed to move smoothly to prevent vibration or noise during movement.

Such control may improve the work safety of the cook and help maintain a clean and efficient cooking environment. At the same time, it may also provide the added effect of reducing energy consumption by preventing unnecessary operation of the multi-joint robot 300 and the gripper unit 400 when they are not needed.

Meanwhile, if an input is received instructing to insert ingredients according to a recipe, the controller may recognize that the automatic mode among the plurality of modes is selected, and may control the movements of the multi-joint robot 300 and the gripper unit 400 in conjunction with continuously controlling the temperature of the first kettle P1 to cook food through deep-frying in the first kettle P1.

Specifically, the controller built into the robot base 200 drives the power unit to operate the multi-joint robot 300 so that the gripper unit 400 moves toward the first tray cart 610a. In this case, the controller may automatically control the movement of the multi-joint robot 300 according to the type of target food. However, the present disclosure is not limited thereto, and the user may also control the movement of the multi-joint robot 300 using a controller arranged on the robot base 200 or a remote controller. When the multi-joint robot 300 is operated, a plurality of joints of the multi-joint robot 300 move, and the gripper unit 400 may grip the first frying basket 510a contained in the first tray cart 610a.

More specifically, the controller may move the gripper unit 400 to the first tray cart 610a fixed at the first designated position and control the movements of the gripper unit and the multi-joint robot so that the gripper unit grips the first frying basket 510a containing cooking ingredients in the first tray cart 610a. Then, the controller may control the movements of the gripper unit 400 and the multi-joint robot 300 so that the multi-joint robot inserts the first frying basket 510a into the interior of the first kettle while the gripper unit 400 grips the first frying basket 510a. That is, the gripper unit 400 may insert the entire first frying basket 510a into the interior of the first kettle P1 so that the ingredients for deep-frying are fried while being contained in the first frying basket 510a.

As described above, a rounded portion 511a (see FIG. 4) is formed on a lower portion of the basket mesh 511, so the multi-joint robot 300 can insert the first frying basket 510a deep inside the kettle P to fry the cooking ingredients.

The controller may control the movements of the gripper unit 400 and the multi-joint robot 300 so that the first frying basket 510a is taken out from the first kettle P1 after a preset time has elapsed from the point in time when the first frying basket 510a is inserted into the first kettle P1, and then placed back on the first tray cart 610a fixed at the first designated position.

According to some embodiments of the present disclosure, the controller may control the gripper unit 400 and the multi-joint robot 300 to grip the first frying basket 510a before discharging it from the first kettle P1 and perform a shaking operation on the first frying basket 510a. This may be to remove remaining oil from the deep-fried cooking ingredients by shaking the first frying basket 510a in an upward and downward direction.

After controlling the gripper unit 400 and the multi-joint robot 300 to place the first frying basket 510 back on the first tray cart 610a, the controller may then control the gripper unit 400 and the multi-joint robot 300 to grip the second frying basket 510b and perform the same operation.

The cook may release the locking member 650 and push and move the second tray cart 610b to discharge the deep-fried cooking ingredients, thereby completing the large-capacity deep-frying cooking task.

Meanwhile, according to some embodiments of the present disclosure, the controller may control the second kettle P2 so that the cook can cook food in the second kettle P2 separately from the cooking performed in the first kettle P1 by the multi-joint robot 300 and the gripper unit 400.

Specifically, when the cook selects a recipe related to food to be cooked in the second kettle P2, the controller may control the second kettle P2 according to the selected recipe. For example, when the cook selects a first recipe for soup/stew cooking, the controller may recognize information regarding the water temperature and water amount recorded in the first recipe stored in the storage. According to the first recipe stored in the storage, the controller may control the automatic water supply unit of the second kettle P2 so that a preset amount of water is supplied to the second kettle P2. Then, the controller may recognize the temperature of the water supplied to the second kettle P2 through a temperature sensor of the second kettle P2, and if it is recognized that the water temperature of the second kettle has reached the preset temperature, the controller may control the output unit to output a preset notification. In this case, the cook may recognize that the water temperature of the second kettle P2 has reached the preset temperature and perform subsequent operations such as inserting ingredients into the second kettle P2.

Although the present disclosure describes the second kettle P2 as being used for soup/stew cooking, it is not limited thereto, and various types of food cooking such as deep-frying or stir-frying may also be performed in the second kettle P2.

Meanwhile, according to some embodiments of the present disclosure, a agitator may be coupled to the second kettle P2. In this case, the controller may also control at least one movement of the gripper unit and the multi-joint robot in conjunction with controlling the operation of the agitator coupled to the second kettle P2, the temperature of the second kettle P2, and the amount of water supplied to the second kettle P2.

FIG. 16 is a diagram for explaining the performance of soup/stew cooking or stir-frying in the first kettle P1.

Referring to FIG. 16, the cook may select a recipe stored in the storage to operate the cooking robot system 100. In this case, the cook may prepare ingredients for soup/stew cooking or stir-frying and put them into a basket 632. Then, the cook may insert the basket 632 into the vat cart 630 and move the vat cart 630 into the cooking facility. Detailed descriptions of the vat cart 630 have been provided above with reference to FIG. 12, and thus will not be repeated here.

After moving the vat cart 630 to a designated position, the cook may fix the vat cart 630 using the locking member 650. In order for the multi-joint robot 300 to stably grip the basket 632, the vat cart 630 must be fixed at a designated position.

Specifically, a locking base 660 may be installed on the floor surface of the cooking facility. The vat cart 630 may be provided with a locking operation unit 670. The cook may move the vat cart 630 to a location where the locking base 660 is installed, and allow the locking beam 672 of the locking operation unit 670 to be inserted into the locking base 660. In this case, the vat cart 630 may be fixed at a designated position.

More specifically, referring to FIGS. 13 and 14, the cook may grip and rotate the locking handle 674 so that the locking handle 674 moves in the vertical direction (Z) to a position corresponding to the handle hole 673.

Then, the user grips the locking handle 674 and moves it downward along the handle hole 673, so that the locking beam 672 descends along the beam hole 671b and is inserted into the locking hole 661 of the locking base 660. Accordingly, the vat cart 630 may be fixed at a designated position. That is, as shown in FIG. 16, the vat cart 630 may be fixed at the designated position using the locking member 650.

The position at which the vat cart 630 is fixed may be a position appropriately spaced from the third region R3 so that the multi-joint robot 300 can grip the basket 632 placed on the vat cart 630.

In the present disclosure, the vat cart 630 must have a structure that allows it to move through the shelf wheel assembly 635 when transporting ingredients or food. However, after transportation is completed, it must be fixed to restrict movement in order to reduce the risk of personal injury and also reduce the problem of food or ingredients spilling.

In the present disclosure, the vat cart 630 must always be fixed at the same position. If the position at which the vat cart 630 is fixed changes, additional sensors such as a vision sensor must be added to the cooking robot system to identify the position of the vat cart 630, and in such cases, the manufacturing cost of the cooking robot system may exponentially increase. To solve this problem, according to some embodiments of the present invention, the locking base 660 may be installed at a position on the floor of the cooking facility corresponding to the designated position. Therefore, the vat cart 630 may always be fixed at the same position.

In the case of soup/stew cooking, water may be filled into the first kettle P1 in a preset amount via the automatic water supply unit. However, this is not limited thereto, and the cook may also directly pour water into the first kettle P1.

In the case of stir-frying, the cook may pour a small amount of oil into the first kettle P1 and the second kettle P2.

If it is input that the cook will perform soup/stew cooking or stir-frying in the first kettle P1, the controller may control the first kettle P1 so that its temperature reaches a temperature suitable for soup/stew or stir-frying. Specifically, the controller may transmit a control signal to the first kettle P1 via wired or wireless communication so that the temperature of the first kettle P1 becomes suitable for soup/stew or stir-frying. However, the present disclosure is not limited thereto.

The controller may determine, via a temperature sensor, whether the water temperature in the first kettle P1 has reached the temperature for soup/stew cooking or whether the oil temperature has reached the temperature for stir-frying. If the controller recognizes that the water in the first kettle P1 has reached the temperature for soup/stew or the oil has reached the temperature for stir-frying, it may control the output unit to output a preset notification. In this case, the cook may determine whether to cook in the first kettle P1 using the gripper unit 400 and the multi-joint robot 300, or to cook directly in the first kettle P1. That is, a preset notification may be output to allow the cook to choose which mode to perform cooking in, among a plurality of modes (automatic mode and manual mode).

If the controller recognizes that the manual mode among the plurality of modes is selected, it may control the temperature of the first kettle P1 and may not control the movement of the multi-joint robot 300 and the gripper unit 400. In this case, the cook may directly cook food through soup/stew or stir-frying in the first kettle P1.

Meanwhile, in order for the cook to directly cook food through soup/stew or stir-frying in the first kettle P1, the multi-joint robot 300 and the gripper unit 400 may move to or be fixed at a position that does not interfere with the cook's operation.

Specifically, the controller may control the movement of the multi-joint robot 300 and the gripper unit 400 so that they do not invade the cook's operating area. To this end, the multi-joint robot 300 may retreat to the outer area of the cooking space or move to a specific standby position. Meanwhile, the multi-joint robot 300 may move by folding or extending its arms and joints to occupy minimal space.

In the case of the gripper unit 400, it may be safely fixed at a specific position. Also, it may be designed to adjust its operating speed or move smoothly so that no vibration or noise occurs during movement.

Such control may increase the cook's work safety and help maintain a clean and efficient cooking environment. At the same time, it may also provide the added effect of reducing energy consumption by preventing unnecessary operation of the multi-joint robot 300 and the gripper unit 400 when not in use.

Meanwhile, if an input is received to insert ingredients according to a recipe, the controller may recognize that the automatic mode among the plurality of modes is selected, and may control the movement of the multi-joint robot 300 and the gripper unit 400 in conjunction with continuously controlling the temperature of the first kettle P1 to cook food through soup/stew or stir-frying in the first kettle P1.

Specifically, the controller embedded in the robot base 200 drives the power unit to operate the multi-joint robot 300 so that the gripper unit 400 moves toward the vat cart 630. In this case, the controller may automatically control the movement of the multi-joint robot 300 depending on the type of target food. However, the present disclosure is not limited thereto, and the user may also control the movement of the multi-joint robot 300 using a controller disposed in the robot base 200 or a remote controller. When the multi-joint robot 300 is operated, a plurality of joints move and the gripper unit 400 may grip the basket 632 contained in the vat cart 630.

More specifically, the controller may move the gripper unit 400 to the vat cart 630 fixed at the designated position and control the movement of the gripper unit and the multi-joint robot so that the gripper unit grips the basket 632 containing cooking ingredients in the vat cart 630. Then, the controller may control the movement of the gripper unit 400 and the multi-joint robot 300 so that the cooking ingredients in the basket 632 are inserted into the first kettle P1, and then control the movement of the gripper unit 400 and the multi-joint robot 300 to return the basket 632 back to the vat cart 630.

According to some embodiments of the present disclosure, the cooking ingredients to be inserted into the first kettle P1 may be loaded in a plurality of baskets placed on the vat cart 630. In this case, the controller may control the movement of the gripper unit and the multi-joint robot to insert the cooking ingredients in each of the plurality of baskets loaded on the vat cart 630 into the first kettle P1.

According to some embodiments of the present disclosure, the controller may control the movement of the gripper unit 400 and the multi-joint robot 300 to grip a cooking utensil mounted on a holder installed in the fourth region R4 and stir the cooking ingredients inside the first kettle P1. Here, the fourth region R4 may be a region that does not interfere with the cooking of food in the first kettle P1 by the multi-joint robot 300 in the first region R1.

Specifically, the controller may operate the multi-joint robot 300 and the gripper unit 400 to grip the cooking utensil 500 and stir the cooking ingredients inside the first kettle P1. Although not shown in the drawings, the cooking utensil 500 may be mounted on the holder 550.

At this time, the cook may select a cooking utensil 500 corresponding to the type of food and hang it on the holder 550.

Alternatively, although not shown in the drawings, a plurality of holders 550 may be arranged in the fourth region R4, and different types of cooking utensils 500 may be mounted on the respective holders 550.

For example, one holder 550 may have a cooking utensil 500 with a mixing plate mounted, and another holder 550 may have a cooking utensil 500 with a mesh net mounted.

In the case of soup/stew or stir-frying, when the holder 550 is arranged, the cooking utensil 500 with a mixing plate may be mounted.

The controller may operate the multi-joint robot 300 to move the gripper unit 400 in the direction of the holder 550, and operate the gripper unit 400 to grip the cooking utensil 500 mounted on the holder 550.

Specifically, the multi-joint robot 300 moves in the direction of the holder 550, and as shown in FIG. 8, the gripper unit 400 grips the ladle base portion 520 of the cooking utensil 500. Then, when the multi-joint robot 300 lifts, the ladle base portion 520 gripped by the gripper unit 400 is lifted together.

Referring to FIGS. 9 and 10, the hanger block 532 of the cooking utensil 500 is separated from the holder groove 553 of the holder 550 and moves in the direction in which the multi-joint robot 300 moves.

Thereafter, the joints of the multi-joint robot 300 move, moving the cooking utensil 500 in the direction of the first kettle P1, and inserting the mixing plate into the interior of the first kettle P1. Then, the multi-joint robot 300 moves the cooking utensil 500 within a specific range and stirs the cooking ingredients contained in the kettle P.

As described above, the cooking robot system may cook food through soup/stew or stir-frying using the first kettle P1.

Meanwhile, according to some embodiments of the present disclosure, the controller may control the second kettle P2 so that the cook can cook food in the second kettle P2 separately from the cooking performed in the first kettle P1 by the multi-joint robot 300 and the gripper unit 400.

Specifically, when the cook selects a recipe related to food to be cooked in the second kettle P2, the controller may control the second kettle P2 according to the recipe. For example, when the cook selects a first recipe related to soup/stew cooking, the controller may recognize information regarding the water temperature and the water amount recorded in the first recipe stored in the storage. According to the first recipe stored in the storage, the controller may control the automatic water supply unit of the second kettle P2 so that a preset amount of water is supplied to the second kettle P2. Then, the controller may recognize the temperature of the water supplied to the second kettle P2 through a temperature sensor of the second kettle P2, and if it is recognized that the water temperature of the second kettle has reached the preset temperature, the controller may control the output unit to output a preset notification. In this case, the cook may recognize that the water temperature of the second kettle P2 has reached the preset temperature and perform subsequent operations such as inserting ingredients into the second kettle P2.

Although the present disclosure describes the second kettle P2 as being used for soup/stew cooking, it is not limited thereto, and various types of food cooking such as deep-frying or stir-frying may also be performed in the second kettle P2.

Meanwhile, according to some embodiments of the present disclosure, a agitator may be coupled to the second kettle P2. In this case, the controller may also control at least one movement of the gripper unit and the multi-joint robot in conjunction with controlling the operation of the agitator coupled to the second kettle P2, the temperature of the second kettle P2, and the amount of water supplied to the second kettle P2.

According to at least one of the above-described embodiments of the present invention, various types of cooking such as deep-frying, stir-frying, and soup/stew cooking may be performed using a single robot, and food may also be cooked using the kettle even without using the multi-joint robot and the gripper unit, thereby enhancing the usability of the cooking robot system.

In the present disclosure, the cooking robot system is not limited to the specific configurations and methods described in the above-described embodiments, and all or some of the embodiments may be selectively combined to allow various modifications.

Meanwhile, although the present disclosure has been described with reference to the attached drawings, it is merely an example and is not limited to specific embodiments, and various modifications implementable by those skilled in the art to which the present invention pertains are also included within the scope of the claims. In addition, such modified implementations should not be understood separately from the technical spirit of the present invention.

What is claimed is:

1. A cooking robot system comprising:
   a first kettle;
   a multi-joint robot;
   a controller;
   a cooking utensil; and
   a holder that is placed in a cooking facility, and on which the cooking utensil is mounted,
   wherein the controller, when controlling a movement of the multi-joint robot to grip the cooking utensil, determines whether to rotate a gripper unit coupled to the multi-joint robot according to a kind of the cooking utensil,
   wherein the cooking utensil comprises:
      a ladle base portion coupled to the gripper unit;
      a ladle portion connected to a lower part of the ladle base portion; and
      a detachable coupling configured to detachably connect the ladle base portion and the ladle portion,
   wherein the ladle base portion comprises:

a first base;

a second base spaced apart from the first base;

a side base connecting both ends of the first base and both ends of the second base;

a ladle link rod having an upper part connected to the first base and a lower part to which the detachable coupling is disposed; and a hanger portion disposed on the ladle link rod, wherein the hanger portion comprises:

a hanger plate connected to the ladle link rod;

a hanger block connected to a lower part of the hanger plate, protruding toward the ladle portion and having a triangular prism shape; and a hanger flat surface that is formed flat along a longitudinal direction of the hanger block on at least one edge among a plurality of edges forming the hanger block, wherein the holder comprises:

a holder frame;

a holder connecting bar that is connected to the holder frame and inclined downward;

a holder block connected to the holder connecting bar and in which a holder groove is formed, the holder groove being configured to receive the hanger block, the holder block and the holder groove being formed in a triangular prism shape larger than the hanger block; and a holder flat surface that is formed flat along a longitudinal direction of the holder groove on at least one edge among a plurality of edges forming the holder block, the at least one edge being located at a position corresponding to the hanger flat surface, wherein the hanger flat surface is inserted into the holder flat surface, the cooking utensil is mounted at a designated position on the holder, the multi-joint robot moves to the designated position, and the gripper unit grips the ladle base portion.

2. The cooking robot system according to claim 1, wherein the first kettle includes an automatic water supply unit that fills the first kettle with water, and wherein the automatic water supply unit comprises:

a water supply line that draws water from an external water storage or a tap water supply source;

an electric valve that operates upon receiving a control signal from the controller via wired or wireless communication; and a water supply amount sensing unit that recognizes an amount of water supplied into the first kettle.

3. The cooking robot system according to claim 2, wherein the controller controls the automatic water supply unit to supply a preset amount of water to the first kettle according to a prestored recipe.

4. The cooking robot system according to claim 3, further comprising a temperature sensor configured to check a temperature of water supplied to the first kettle, wherein the controller controls a temperature of the first kettle such that the temperature of the water supplied to the first kettle becomes a preset temperature according to the prestored recipe, and controls an output unit to output a preset alert when the temperature of the water supplied to the first kettle reaches the preset temperature through the temperature sensor.

5. The cooking robot system according to claim 4, wherein the controller, after controlling the output unit to output the preset alert, recognizes a currently selected mode among multiple modes, and, determines whether to cook food in the first kettle by controlling the movement of the multi-joint robot in conjunction with controlling the first kettle, depending on a type of the currently selected mode.

6. The cooking robot system according to claim 5, wherein the controller controls the first kettle and does not control the movement of the multi-joint robot when recognizing that a manual mode among the multiple modes is selected, and wherein the controller controls the movement of the multi-joint robot in conjunction with controlling the first kettle in order to cook food in the first kettle when recognizing that an automatic mode among the multiple modes is selected.

7. The cooking robot system according to claim 1, further comprising a second kettle different from the first kettle, wherein the controller controls at least one of an amount of water supplied to the second kettle and a temperature of the second kettle, separately from controlling at least one of an amount of water supplied to the first kettle and the temperature of the first kettle.

8. The cooking robot system according to claim 1, wherein the controller is configured to control an amount of water supplied to the first kettle, a temperature of the first kettle, and the movement of the multi-joint robot.

9. The cooking robot system according to claim 1, wherein the gripper unit is detachably coupled to each of a plurality of cooking utensils to cook a plurality of different types of food.

10. The cooking robot system according to claim 1, wherein the ladle base portion further comprises a fitting block that connects an upper part of the first base and an upper part of the second base, and in which a fitting hole is formed to penetrate through a central side, and wherein the second base is inclined toward the first base from bottom to top.

11. The cooking robot system according to claim 1, wherein the ladle portion comprises:

a ladle rod in which a ladle opening groove is formed at an upper end to receive a lower end of the ladle link rod; and a cooking block connected to a lower end of the ladle rod.

12. The cooking robot system according to claim 1, wherein the detachable coupling comprises:

a detaching hole formed to penetrate through an upper part of the ladle rod; and a spring pin disposed to protrude radially from a lower part of the ladle link rod, and wherein the spring pin is detachably inserted into the detaching hole such that the ladle rod and the ladle link rod are detachable from each other.

13. The cooking robot system according to claim 1, wherein the holder further comprises a holder beam disposed below the holder block on the holder frame and configured to support a side of the ladle rod, wherein the holder beam comprises a first holder beam and a second holder beam that open in directions facing each other.

14. The cooking robot system according to claim 1, wherein the cooking utensil comprises a frying basket, wherein the frying basket comprises:

a basket mesh configured to accommodate cooking ingredients;

a rounded portion formed at a lower part of the basket mesh and curved downward; and a basket frame connected to an upper part of the basket mesh and coupled to the gripper unit, wherein the basket frame comprises:

a first bar that is connected to the basket mesh, protrudes upward, and is bent in a rectangular beam shape;

a second bar that is disposed adjacent to the first bar on the basket mesh, protrudes upward in an inclined manner, and is bent in a rectangular beam shape;

a first lower crossbar that connects across both sides of the first bar;

a second lower crossbar that connects across both sides of the second bar; and an upper crossbar that connects upper part of the first bar and upper part of the second bar.

* * * * *